US012084242B2

(12) United States Patent
Pinkstone et al.

(10) Patent No.: US 12,084,242 B2
(45) Date of Patent: Sep. 10, 2024

(54) CARTON WITH TAMPER-EVIDENT FEATURE

(71) Applicant: Graphic Packaging International, LLC, Atlanta, GA (US)

(72) Inventors: Felicia A. Pinkstone, Aston, PA (US); Michael D. Ryan, Media, PA (US)

(73) Assignee: Graphic Packaging International, LLC, Atlanta, GA (US)

( * ) Notice: Subject to any disclaimer, the term of this patent is extended or adjusted under 35 U.S.C. 154(b) by 874 days.

(21) Appl. No.: 17/003,146

(22) Filed: Aug. 26, 2020

(65) Prior Publication Data

US 2021/0061531 A1 Mar. 4, 2021

Related U.S. Application Data

(60) Provisional application No. 62/895,603, filed on Sep. 4, 2019, provisional application No. 62/892,203, filed on Aug. 27, 2019.

(51) Int. Cl.

*B65D 55/06* (2006.01)
*B31B 50/81* (2017.01)
*B65D 43/02* (2006.01)

(52) U.S. Cl.

CPC ............ *B65D 55/06* (2013.01); *B31B 50/812* (2017.08); *B65D 43/0256* (2013.01); *B65D 2401/60* (2020.05)

(58) Field of Classification Search

CPC ................ B65D 55/06; B65D 43/0256; B65D 2401/60; B65D 2255/06; B65D 2401/05; B65D 2543/00194; B65D 2543/0024; B65D 2543/00296; B65D 5/54; B65D 5/4245; B65D 2401/15; B65D 2543/00268; B65D 2543/00574; B65D 3/268; B65D 5/643; B65D 43/22; B65D 5/68;

(Continued)

(56) References Cited

U.S. PATENT DOCUMENTS

| | | | | |
|---|---|---|---|---|
| 896,642 A | | 8/1908 | Klein | |
| 5,036,981 A | * | 8/1991 | Johansson | B65D 5/5455 229/164 |

(Continued)

FOREIGN PATENT DOCUMENTS

| | | | | |
|---|---|---|---|---|
| DE | 80 06 601 U1 | | 7/1980 | |
| EP | 2025608 A2 | * | 2/2009 | B65D 5/4237 |

(Continued)

OTHER PUBLICATIONS

Patent Examination Report 1 for New Zealand Application No. 783961 dated Oct. 17, 2023.

(Continued)

*Primary Examiner* — Christopher R Demeree

(74) *Attorney, Agent, or Firm* — Womble Bond Dickinson (US) LLP

(57) ABSTRACT

A tamper-evident structure for securing a lid to a container of a carton for holding a food product includes a plurality of panels having a top panel and at least one side panel, and at least one panel of the plurality of panels is for being attached to at least one of the lid and the container of the carton. At least one indicating feature provides indication that the lid has been at least partially removed from the container.

49 Claims, 23 Drawing Sheets

(58) Field of Classification Search
CPC .. B65D 2571/0066; B65D 2571/00277; B65D 2571/00716; B65D 2401/00; B65D 2571/00543; B65D 2571/0079; B65D 5/18; B65D 5/5455; G09F 3/0341
USPC ............. 229/102, 103.2; 206/427, 434, 807; 428/41.8
See application file for complete search history.

(56) References Cited

U.S. PATENT DOCUMENTS

| | | | | |
|---|---|---|---|---|
| 5,704,649 | A | 1/1998 | Small | |
| 7,019,271 | B2 | 3/2006 | Wnek et al. | |
| 7,351,942 | B2 | 4/2008 | Wnek et al. | |
| 7,752,827 | B2 | 7/2010 | Learn et al. | |
| 7,819,583 | B2 | 10/2010 | Walker et al. | |
| 7,882,952 | B2 | 2/2011 | Learn et al. | |
| 7,923,669 | B2 | 4/2011 | Wnek et al. | |
| 8,002,171 | B2 | 8/2011 | Ryan et al. | |
| 8,127,518 | B2 | 3/2012 | Ford | |
| 8,523,049 | B2 | 9/2013 | Fitzwater | |
| 8,563,906 | B2 | 10/2013 | Wnek et al. | |
| 8,740,054 | B2 | 6/2014 | Pinkstone | |
| 8,753,012 | B2 | 6/2014 | Files et al. | |
| 8,800,855 | B2 | 8/2014 | Fitzwater | |
| 9,108,761 | B2 | 8/2015 | Fitzwater et al. | |
| 9,156,579 | B2 | 10/2015 | Pinkstone | |
| 9,156,582 | B2 | 10/2015 | Walsh et al. | |
| 9,169,037 | B2 | 10/2015 | Pinkstone | |
| 9,315,288 | B2 | 4/2016 | Pinkstone et al. | |
| 9,346,582 | B2 | 5/2016 | Pinkstone | |
| 9,376,231 | B2 | 6/2016 | Pinkstone | |
| 9,481,486 | B2 | 11/2016 | Nameth et al. | |
| D777,027 | S | 1/2017 | Baker et al. | |
| 9,650,184 | B2 | 5/2017 | Flly et al. | |
| 9,868,563 | B2 | 1/2018 | Pinkstone | |
| 10,124,947 | B2 | 11/2018 | Pinkstone et al. | |
| 10,232,976 | B2 | 3/2019 | Waddington | |
| 10,287,073 | B2 | 5/2019 | Zammit et al. | |
| 10,301,090 | B2 | 5/2019 | Holley, Jr. | |
| 10,414,573 | B2 | 9/2019 | Pinkstone | |
| 10,472,120 | B2 | 11/2019 | Cooper et al. | |
| 10,562,687 | B2 | 2/2020 | Pinkstone et al. | |
| 11,352,163 | B2 * | 6/2022 | Haidacher .............. | B65D 5/541 |
| 2006/0157545 | A1 * | 7/2006 | Auclair .................. | B65D 71/20 229/198.2 |
| 2007/0130811 | A1 | 6/2007 | Shevelev et al. | |
| 2017/0305630 | A1 | 10/2017 | Miller | |

FOREIGN PATENT DOCUMENTS

| | | | | |
|---|---|---|---|---|
| EP | 3 070 701 | A1 | 9/2016 | |
| GB | 2236100 | A * | 3/1991 | ............. B65D 55/06 |
| GB | 2 239 861 | A | 7/1991 | |
| GB | 2486290 | A | 6/2012 | |
| JP | 2007-76678 | A | 3/2007 | |
| JP | 2010-208695 | A | 9/2010 | |
| WO | WO 1997/018131 | A1 | 5/1997 | |
| WO | WO 2005/009857 | A1 | 2/2005 | |

OTHER PUBLICATIONS

Office Action for Canadian Patent Application No. 3,148,615 dated Mar. 22, 2023.
International Search Report and Written Opinion for PCT/US2020/047906 dated Nov. 27, 2020.
Supplementary European Search Report for EP 20 85 8575 dated Aug. 28, 2023.

* cited by examiner

CARTON WITH TAMPER-EVIDENT FEATURE

CROSS-REFERENCE TO RELATED APPLICATIONS

This application claims the benefit of each of U.S. Provisional Patent Application No. 62/892,203, filed on Aug. 27, 2019, and U.S. Provisional Patent Application No. 62/895,603, filed on Sep. 4, 2019.

INCORPORATION BY REFERENCE

The disclosures of each of U.S. Provisional Patent Application No. 62/892,203, filed on Aug. 27, 2019, and U.S. Provisional Patent Application No. 62/895,603, filed on Sep. 4, 2019, are hereby incorporated by reference for all purposes as if presented herein in their entirety.

BACKGROUND OF THE DISCLOSURE

The present disclosure generally relates to cartons for holding a food product. More specifically, the present disclosure relates to a carton having a tamper-evident feature to indicate opening of the carton.

SUMMARY OF THE DISCLOSURE

According to one aspect of the disclosure, a tamper-evident structure for securing a lid to a container of a carton for holding a food product comprises a plurality of panels comprising a top panel and at least one side panel. At least one panel of the plurality of panels is for being attached to at least one of the lid and the container of the carton. The tamper-evident structure further comprises at least one indicating feature that provides indication that the lid has been at least partially removed from the container.

According to another aspect of the disclosure, a package comprises a carton for holding a food product and comprising a container and a lid removably engaged with the container. The package further comprises a tamper-evident structure securing the lid to the container. The tamper-evident structure comprises a plurality of panels comprising a top panel and at least one side panel. At least one panel of the plurality of panels is attached to at least one of the lid and the container of the carton. The tamper-evident structure further comprises at least one indicating feature for providing indication that the lid has been at least partially removed from the container.

According to another aspect of the disclosure, a blank for forming a tamper-evident structure for securing a lid to a container of a carton for holding a food product comprises a plurality of panels comprising a top panel and at least one side panel. At least one panel of the plurality of panels is for being attached to at least one of the lid and the container of the carton when the tamper-evident structure is formed from the blank. The blank further comprises at least one indicating feature for providing indication that the lid has been at least partially removed from the container when the tamper-evident structure is formed from the blank.

According to another aspect of the disclosure, a method of securing a lid to a container of a carton for holding a food product comprises obtaining a blank comprising a plurality of panels including a top panel and at least one side panel. The blank further includes at least one indicating feature. The method further comprises forming a tamper-evident structure from the blank by attaching at least one panel of the plurality of panels to at least one of the lid and the container of the carton to secure the lid to the container. The at least one indicating feature is positioned for providing indication that the lid has been at least partially removed from the container.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

The present disclosure generally relates to cartons, trays, canisters, lids, carriers, packages, constructs, sleeves, or the like, for holding food products such as frozen food products, e.g., ice cream, frozen yogurt, sherbet, sorbet, flavored ices, etc. Cartons according to the present disclosure can accommodate other types of food products without departing from the disclosure. In this specification, the terms "lower," "bottom," "upper," "top," "front," and "back" indicate orientations determined in relation to fully erected cartons or containers.

Figure 1:
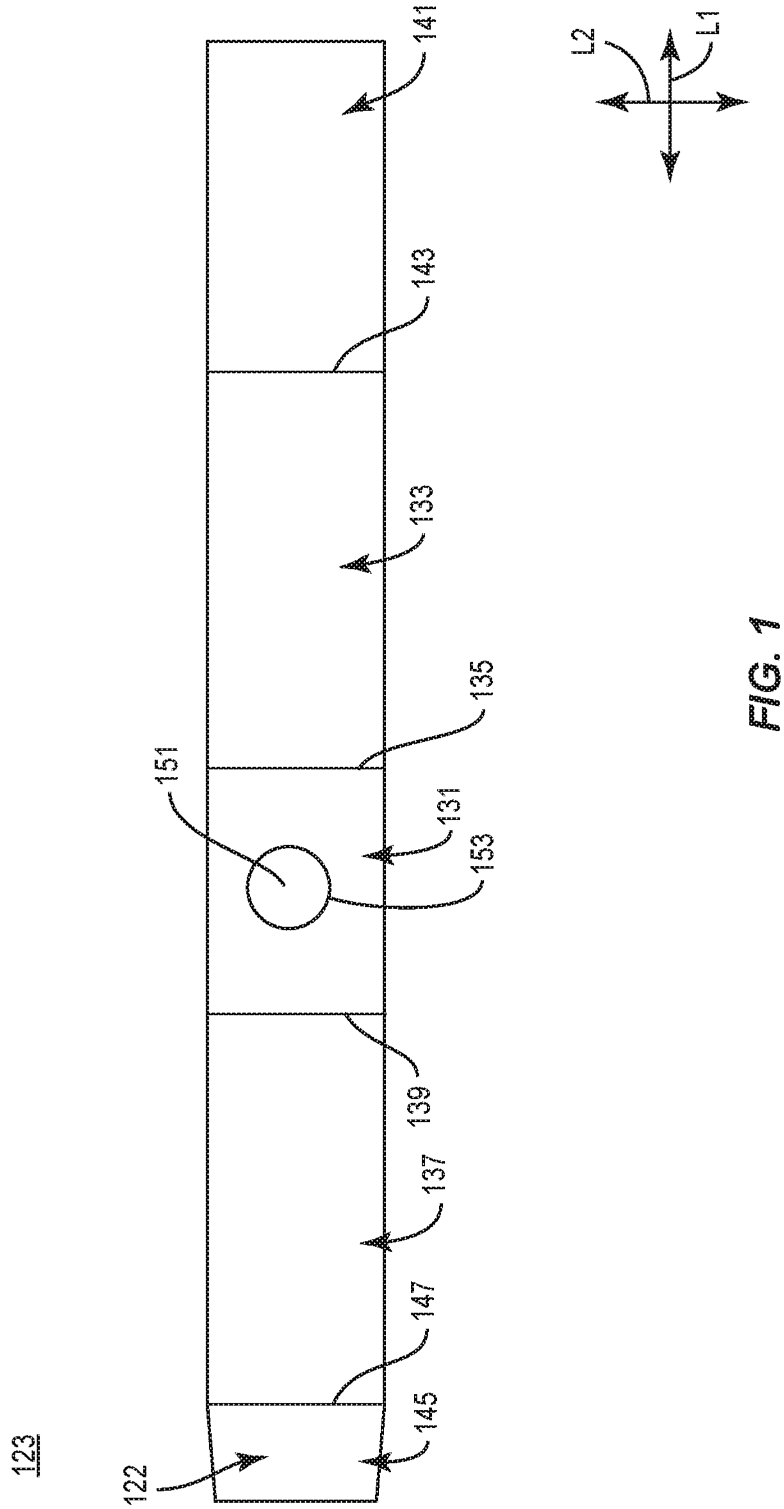
FIG. 1 is a plan view of an exterior surface of a blank for forming a tamper-evident structure according to a first exemplary embodiment of the disclosure.
Figure 2:
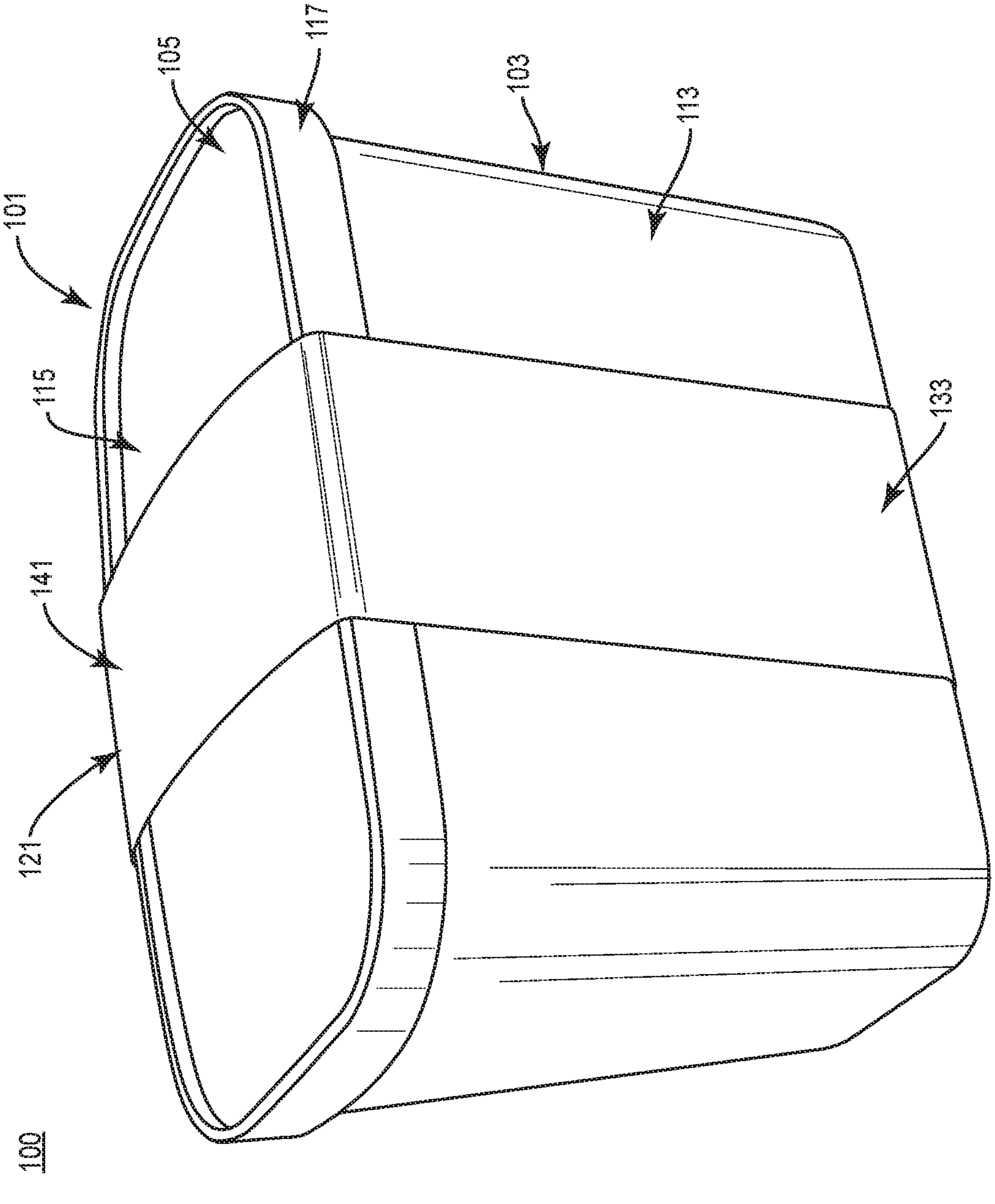
FIG. 2 is a perspective view of a package including a carton and a tamper-evident structure formed from the blank of FIG. 1 according to the first exemplary embodiment of the disclosure.

FIG. 1 is a plan view of an exterior side 122 of a blank 123 for forming a tamper-evident sleeve or tamper-evident feature or tamper-evident structure 121 according to a first exemplary embodiment of the disclosure. Referring momentarily to FIG. 2, the structure 121 can be engaged, e.g., so to at least partially extend and/or attach to, or otherwise provided with a carton 101 to form a package 100.

As shown in FIG. 2, the carton 101 can include a canister or container 103 and a lid 105 removably attached to the container 103. In one embodiment, the container 103 can have a bottom panel 111 (FIG. 3) and a side wall or side panel 113 that extends around the perimeter of the container 103 to form an open top. In one embodiment, the bottom panel 111 and side panel 113 can comprise paperboard or other suitable material.

In the illustrated embodiment, the lid 105 can include a central panel 115 attached to a rim 117. In one embodiment, the central panel 115 can comprise paperboard or other suitable material and the rim 117 can be made of polymeric material, e.g., a plastic such as Low Density Polyethylene (LDPE), High Density Polyethylene (HDPE), Polypropylene (PP), High Impact Polystyrene (HIPS), or any other suitable material.

The rim 117 can be configured to releasably attach the lid 105 to a top edge of the side wall 113 of the container 103 to close the carton 101. The top edge of the side wall 113 can be a rolled edge or otherwise configured to form a secure, releasable connection with the rim 117 of the lid 105.

In this regard, the carton 101 defines an interior for holding one or more food products or articles that can include, for example, frozen or chilled food products, and the lid 105 can be engaged or disengaged with the container 103 to provide selective access to the interior of the carton 101 and food products stored therein.

In one embodiment, the package 100 includes the tamper-evident structure 121 in the form of a sleeve that secures the lid 105 to the container 103. In one embodiment, the sleeve 121 extends around the front, top, back, and bottom of the carton 101.

Still referring to FIG. 1, the blank 123 has a longitudinal axis L1 and a lateral axis L2. The blank 123 includes a bottom panel 131 foldably connected to a first side panel or front panel 133 at a lateral fold line 135, a second side panel or back panel 137 foldably connected to the bottom panel 131 at a lateral fold line 139, and a top panel 141 foldably connected to the front panel 133 at a lateral fold line 143. The blank 123 can also include an adhesive flap 145 foldably connected to the back panel 137 at a lateral fold line 147.

In the illustrated embodiment, the bottom panel 131 includes a tamper-evident portion 151 (broadly, "first indicating feature") defined by a circular tear line 153. The tamper-evident portion 151 and the tear line 153 could be otherwise shaped, arranged, and/or configured without departing from the disclosure. For example, the tamper-evident portion could be formed by a tear line having one or more curved and/or angled portions.

The carton 101 of the first embodiment can by formed by first filling the container 103 with food product, and attaching the lid 105 to the container 103 to close the carton 101. Thereafter, the tamper-evident structure 121 can be formed from the blank 123 into a sleeve configuration that wraps around the carton 101 to hold the container 103 closed with the lid 105. In such an arrangement, the bottom panel 131 of the sleeve 121 can be attached to the bottom panel 111 of the container 103 such that the tamper-evident portion 151 is adhesively attached to the bottom panel 111 of the container 103 by adhesive such as glue or other suitable material.

Figure 3:
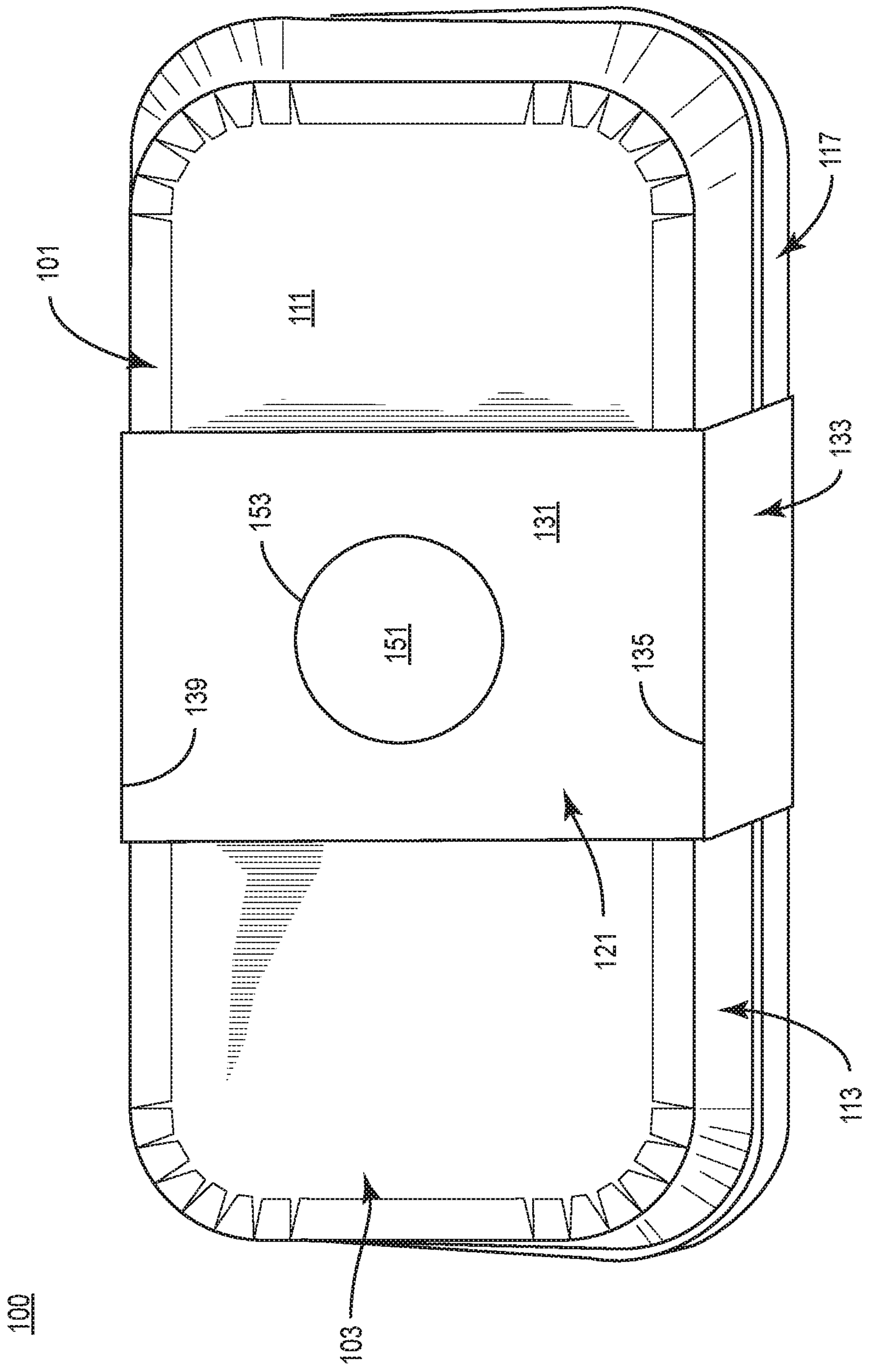
FIG. 3 is a bottom perspective view of the package of FIG. 2.

With additional reference to FIGS. 2 and 3, in one embodiment, the structure 121 can be formed by folding the front and back panels 133, 137 relative to the bottom panel 31 at the respective fold lines 135, 139, folding the top panel 141 relative to the front panel 133 at the fold line 143, and folding the adhesive flap 145 relative to the back panel 137 at the fold line 147 and adhesively attaching the adhesive flap 145 to the top panel 141.

In the aforementioned arrangement, the structure 121 has the form of a generally four-sided sleeve in which the top panel 141 extends across the lid 105 of the carton 101, the front panel 133 extends adjacent the front of the container 103, the bottom panel 131 is adjacent and adhesively attached to the bottom panel 111 of the container 103, and the back panel 137 is adjacent the back of the container 103.

In this regard, the tamper-evident structure 121 can be tightly/securely wrapped around the carton 101 to inhibit or prevent removal of the lid 105 from the container 103 without tearing, deforming, removing, and/or otherwise altering the structure 121. While the tamper-evident structure 121 has been described as wrapped or formed around the closed container 103 with lid 105, the structure 121 could be alternatively formed and attached to the container 103 and/or lid 104 without departing from the disclosure.

Figure 4:
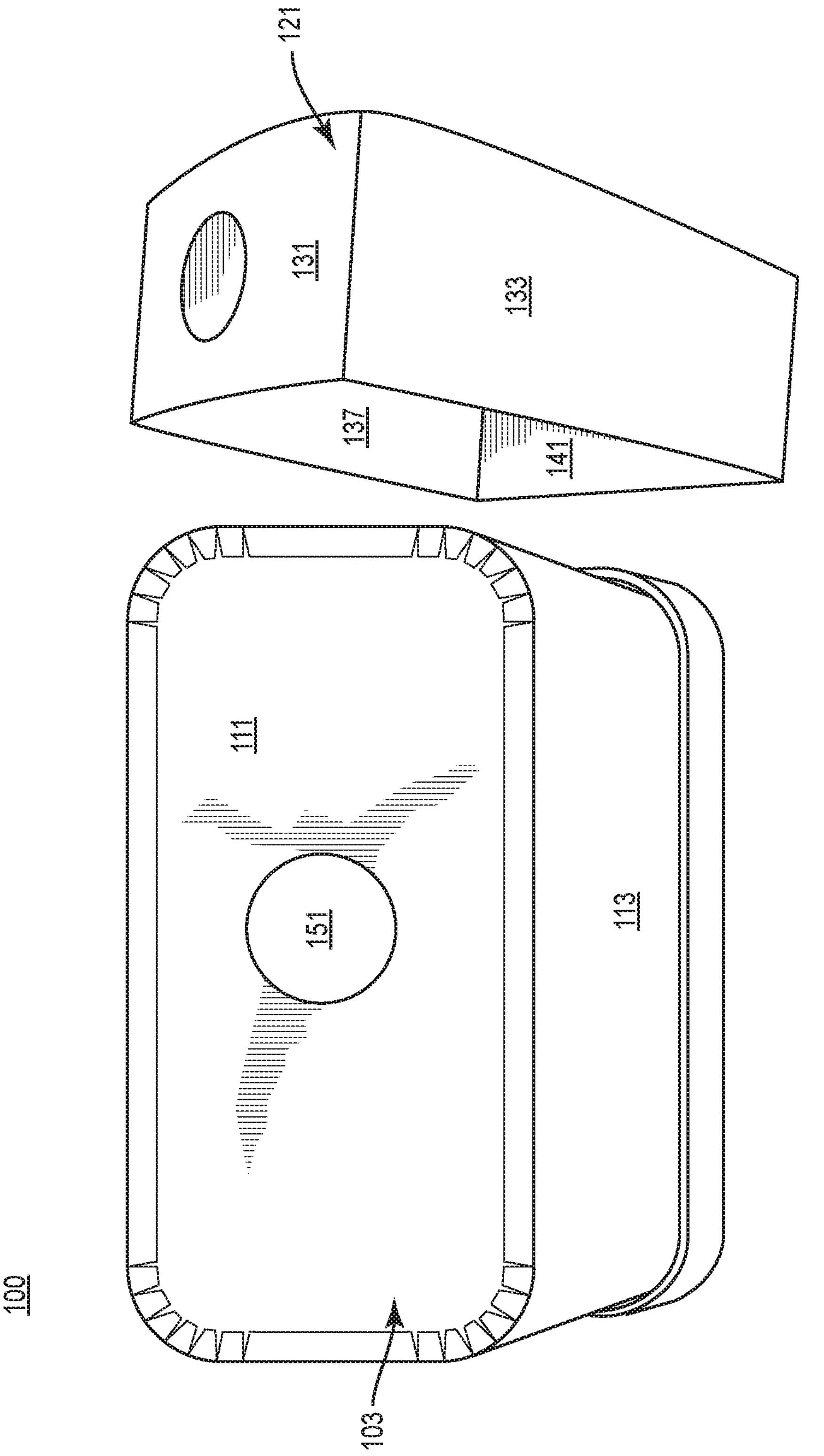
FIG. 4 is a bottom perspective view of the package of FIG. 2, with the tamper-evident structure removed from the carton.

As shown in FIG. 4, when the tamper-evident structure 121 is removed from the closed container 103, the tamper-evident portion 151 of the bottom panel 131 tears along the tear line 153, separates from the bottom panel 131 of the structure 121, and remains adhesively attached to the bottom panel 111 of the container 103 to provide visual evidence/indication that the tamper-evident structure 121 has been removed and that the lid 104 has been at least partially removed from the container 103 or that the lid is free to be removed from the container. In this regard, the tamper-evident structure 121 includes the tamper-evident portion 151 as an indicating feature that provides visual indication that the tamper-evident structure 121 is removable/has been at least partially removed from the carton 101 to allowing removal of the lid 105 from the container 103.

It will be understood that the structure 121 could have other tamper-evident portions that remain attached to container 103 and/or lid 105 without departing from the disclosure. In one embodiment, the tamper-evident portion 151 could be printed with indicia or labeling to indicate to a user that the structure 121 has been removed/is at least partially removable from the carton 101 and that the lid 105 is at least partially removable/has been removed from the container 103 to allow access to food product within the container 103. The structure 121 could be otherwise shaped, arranged, and/or configured without departing from the disclosure.

Figure 5:
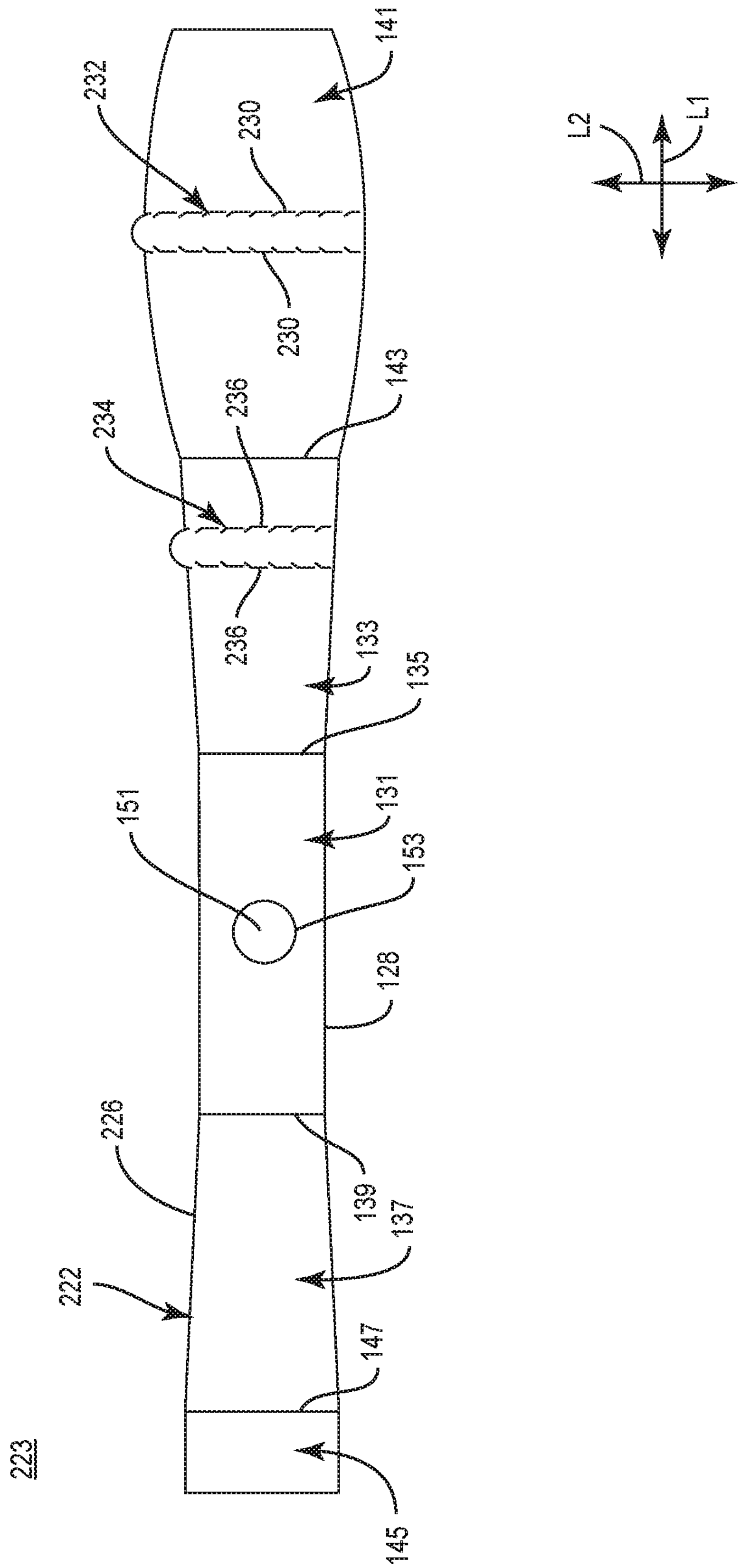
FIG. 5 is a plan view of an exterior surface of a blank for forming a tamper-evident structure according to a second exemplary embodiment of the disclosure.

FIG. 5 shows a plan view of an exterior surface 222 of a blank 223 for forming a tamper-evident structure 221 according to a second exemplary embodiment of the disclosure. The blank 223 and tamper-evident structure 221 can have one or more features similar to the blank 123 and tamper-evident structure 121 described above, and like or similar features are designated with like or similar reference numerals. The tamper-evident structure 221 can be engaged or otherwise provided with a carton 101 to form a package 200 (FIG. 6).

As shown in FIG. 5, the blank 223 has the longitudinal axis L1 and that lateral axis L2 and includes a bottom panel 131, a first side panel 133, a second side panel 137, a top panel 141, an adhesive flap 145, and fold lines 135, 139, 143, 147, similar to the blank 123 of the first exemplary embodiment.

In the illustrated embodiment, the blank 223 has edges 226, 228 that can be curved or oblique at portions along the length of the edges. As shown, the top panel 141 can have a lateral tear strip 232 (broadly, "second indicating feature") defined between a pair of lateral tear lines/lines of weakening 230 in the top panel 141. Similarly, the side panel 133 can have a lateral tear strip 234 (broadly, "third indicating feature") defined between a pair of tear lines/lines of weakening 236 in the side panel 133.

Figure 6:
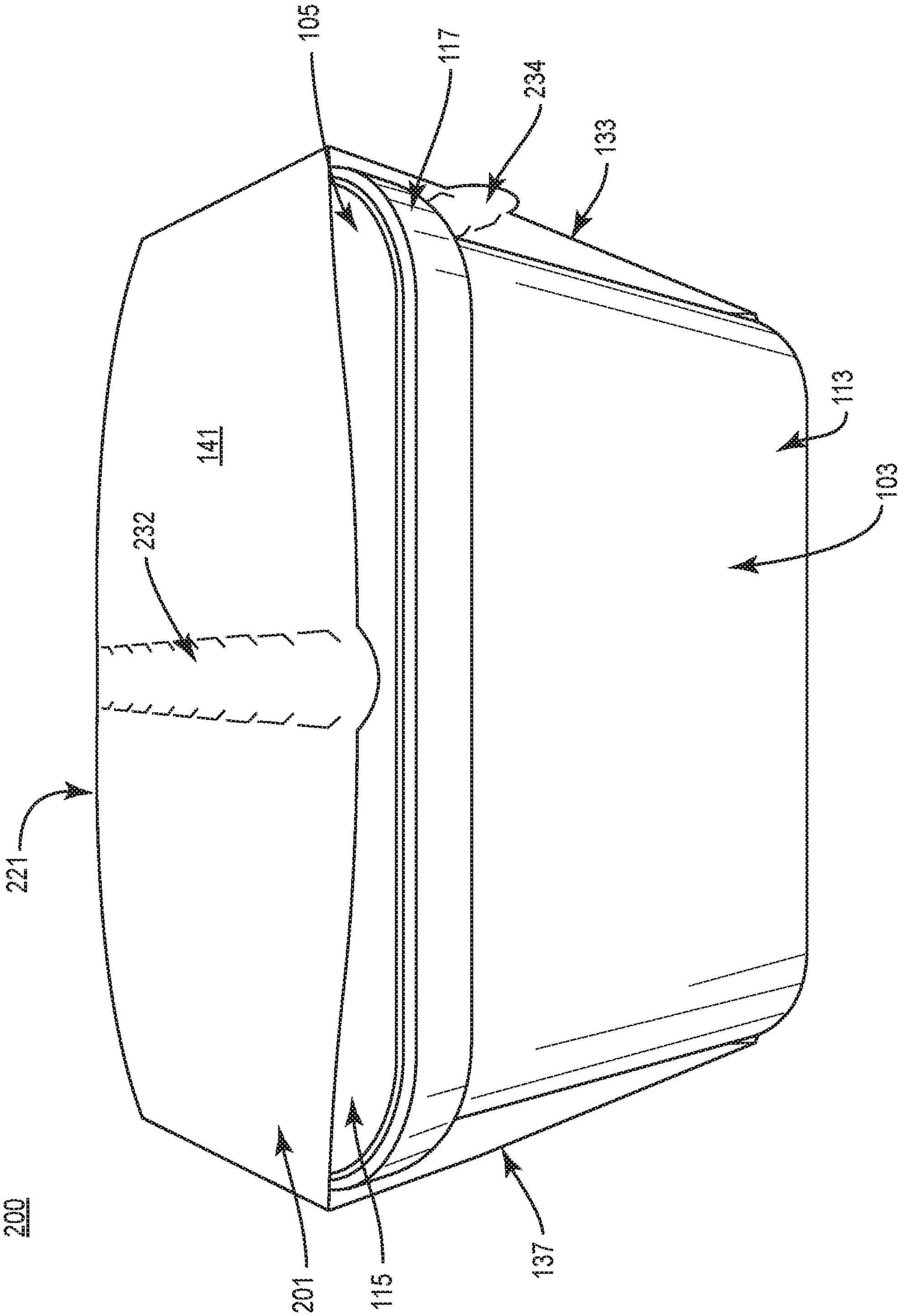
FIG. 6 is a perspective view of a package including a carton and a tamper-evident structure formed from the blank of FIG. 5 according to the second exemplary embodiment of the disclosure.

As shown in FIG. 6, the tamper-evident structure 221 is sized and shaped so that the top panel 141 and bottom panel 131 extend across the length of the container 103 and the panels 133, 137 are adjacent the ends of the container 103 when the package 200 is formed from the carton 101 and the structure 221. The package 200 can be formed in a similar manner as the package 100 of the first exemplary embodiment, in that the structure 221 can extend at least partially around the closed container 103 to prevent removal of the lid 105 without tearing, deforming, removing, and/or otherwise altering the structure 221.

Figure 7:
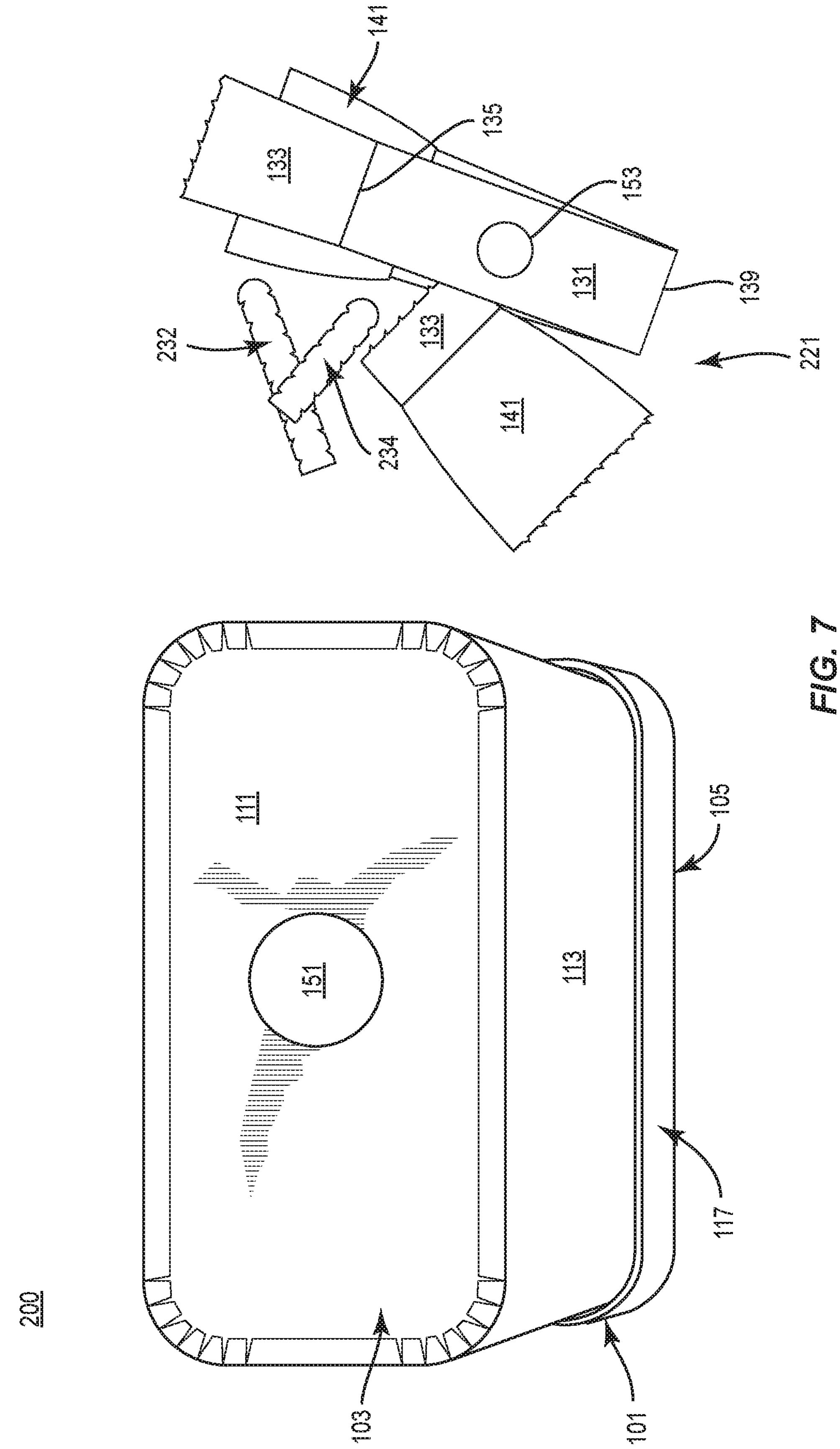
FIG. 7 is a bottom perspective view of the package of FIG. 6 with the tamper-evident structure removed from the carton.

Turning to FIG. 7, one or both of the tear strips 232, 234 of the structure 221 can be separated from the structure 221 at the respective tear lines 230, 236 to facilitate removal of the structure 221 from the carton 201 and allow removal of the lid 105 and access to the container 103. In one embodiment, portions of the structure 221 can be separated at a single one or another combination of the tear lines 230, 236 to facilitate disengagement of the tamper-evident structure 221 from the carton 101.

Furthermore, the tamper-evident portion 151 of the bottom panel 131 of the sleeve 221 attaches to the bottom panel 111 of the container 103 in a similar manner as described above with regard to the structure 121 of the first embodiment and separates from the structure 221 upon removal of the structure 221 from the container 103 to provide a visual indication that the structure 221 has been removed.

In this regard, the tamper-evident structure 221 includes one or more of the tamper-evident portion 151, the tear strip 232 (and/or associated tear lines 230), and the tear strip 234 (and/or associated tear lines 236) as indicating features that provide indication that the tamper-evident structure 221 has been at least partially removed from the package 200 allowing removal of the lid 105 from the container 103, or that the lid 105 has been removed from the container 103.

It will be understood that the structure 221 could have other tamper-evident portions that remain attached to container 103 and/or lid 105 without departing from the disclosure. In one embodiment, the tamper-evident portion 151 could be printed with indicia or labeling to indicate to a user that the structure 221 has been removed from the carton 101 and that the lid 105 is removable/has been removed from the container 103 to allow access to food product within the container 103. The structure 221 could be otherwise shaped, arranged, and/or configured without departing from the disclosure.

Figure 8:
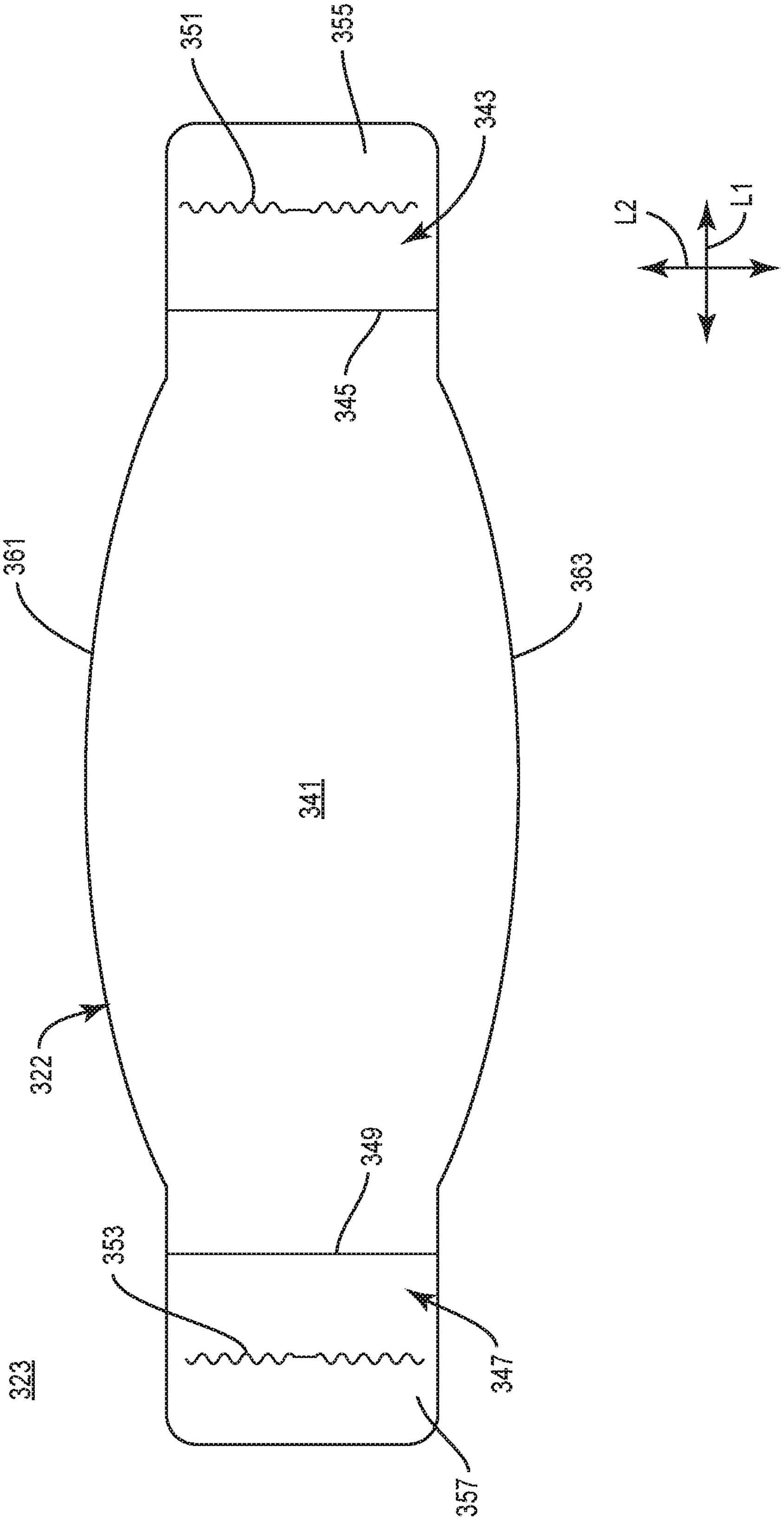
FIG. 8 is a plan view of an exterior surface of a blank for forming a tamper-evident structure according to a third exemplary embodiment of the disclosure.

FIG. 8 shows a plan view of an exterior surface 322 of a blank 323 for forming a tamper-evident structure 321 (FIG. 9) according to a third exemplary embodiment of the disclosure. The blank 323 and tamper-evident structure 321 can have one or more features similar to the blanks 123, 223 and tamper-evident structures 121, 221 described above, and like or similar features are designated with like or similar reference numerals. The tamper-evident structure 321 can be engaged or otherwise provided with a canister or container 103 and an accompanying lid 105 to form a package 300.

The tamper-evident structure 321 can be used in combination with the same style of carton 101 as the tamper-evident structures 121, 221 to form a package 300 having tamper-evident features. In one embodiment, the tamper-evident structure 321 engages the top of the lid 105 of the carton 101 and attaches to the ends of the side wall 113 of the container 103.

As shown in FIG. 8, the blank 323 has the longitudinal axis L1 and that lateral axis L2 and includes a central panel 341, a first side flap 343 (broadly, "first side panel") foldably connected to the central panel 341 at a lateral fold line 345, and a second side flap 347 (broadly, "second side panel") foldably connected to the central panel 341 at a lateral fold line 349. Each of the side flaps 343, 347 have a respective lateral tear line/line of weakening 351, 353 that define a respective tamper-evident portion 355, 357 at the distal end of the respective side flap 343, 347. The tear lines 351, 353, as shown, can include one or more curved portions, e.g., so as to include one or more sinusoidal cut portions and/or wave portions. One or both of the tear lines 351, 353 can include one or more discontinuities therealong. In one embodiment, the central panel 341 has respective curved edges 361, 363, but the central panel 341 and/or the side flaps 343, 347 could be otherwise shaped, arranged, and/or configured without departing from the disclosure.

The structure 321 can be sized and shaped so that the central panel 341 extends across the length of the container 103 adjacent to and on top of the lid 105, and the side flaps 343, 347 can extend downwardly from the lid 105 to be adjacent a portion of the side wall 113 of the container 103 at the ends of the container 103 when the package 300 is formed from the carton 101 and the tamper-evident structure 321.

Figure 9:
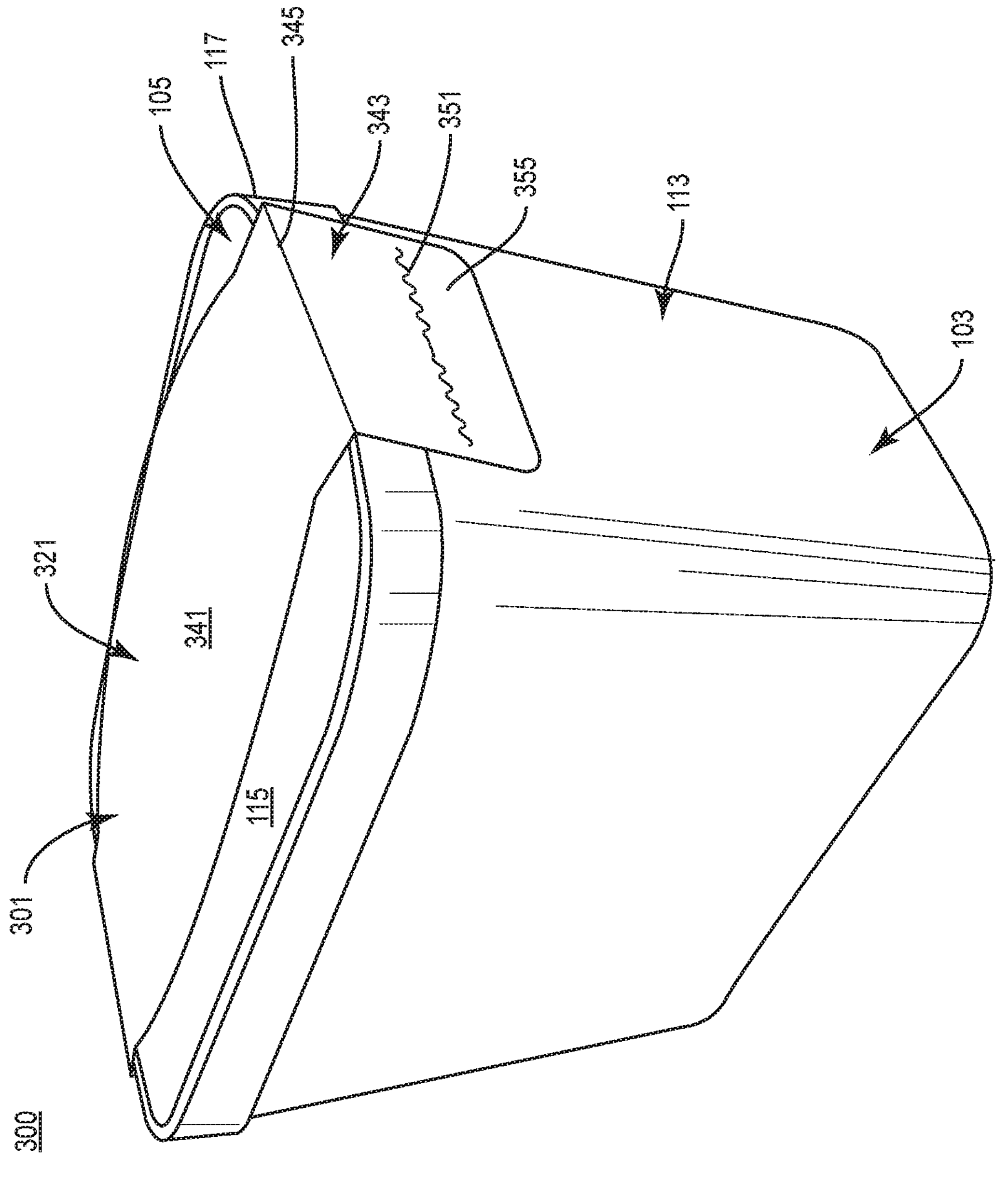
FIG. 9 is a perspective view of a package including a carton and a tamper-evident structure formed from the blank of FIG. 8 according to the third exemplary embodiment of the disclosure.

With additional reference to FIG. 9, the package 300 can be formed in a similar manner as described above with regard to the previous embodiments in that the container 103 can be filled with food product and the lid 105 can be attached to the container 103 to close the carton 101.

Thereafter, the tamper-evident structure 321 can be attached to the closed carton 101 by placing the central panel 341 in at least partial face-to-face contact with the lid 105 and downwardly folding the side flaps 343, 347 relative to the central panel 341 at the respective fold lines 345, 349.

The side flaps 343, 347 can be adhesively attached to the ends of the side wall 113 of the container 103 by adhesively attaching the tamper-evident portions 355, 357 to the container with adhesive such as glue. In this regard, the attachment of the tamper-evident structure 321 to the container 101 inhibits or prevents removal of the lid 105 from the container 103 without first tearing, deforming, removing, and/or otherwise altering the structure 321.

Figure 10:
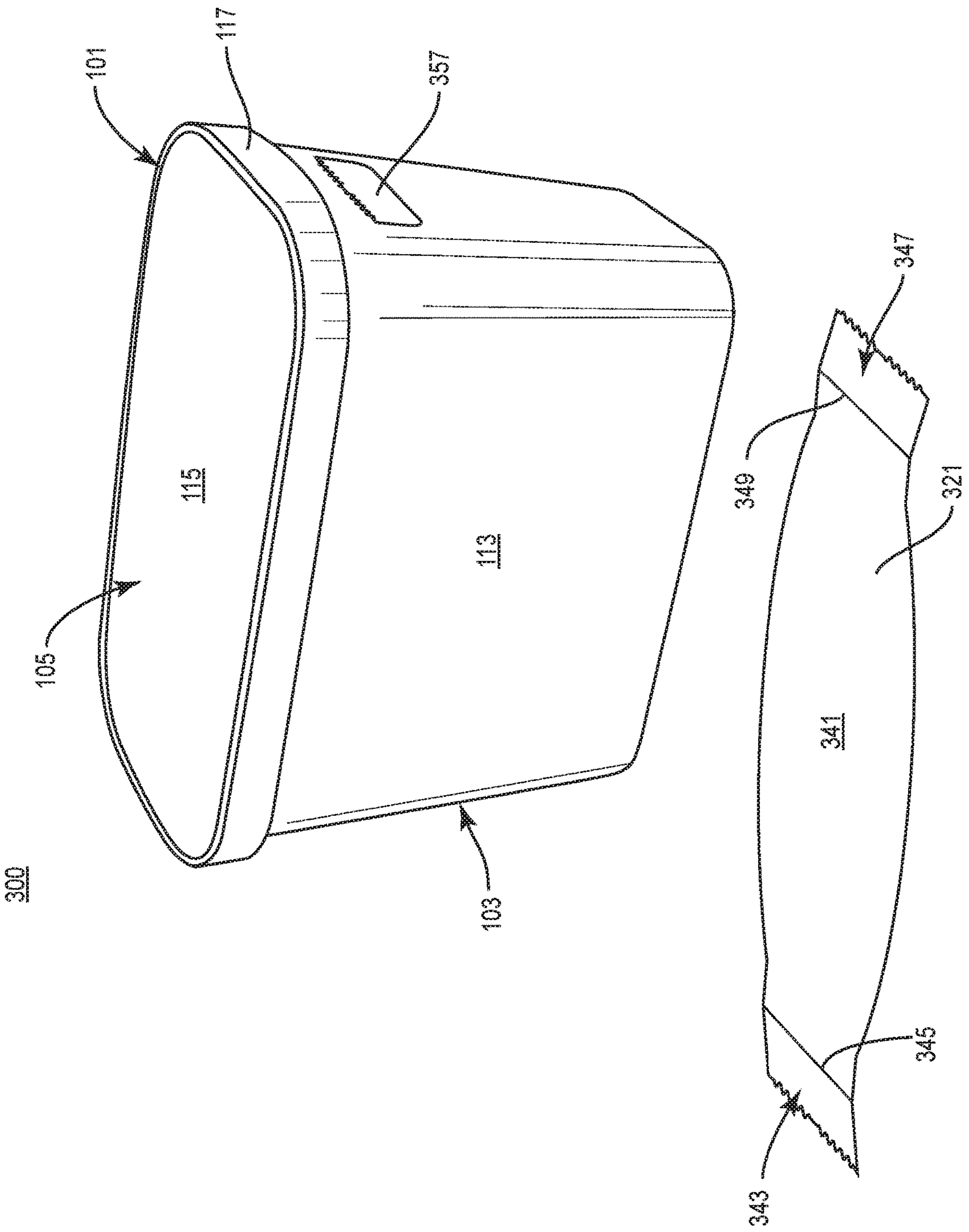
FIG. 10 is a bottom perspective view of the package of FIG. 9 with the tamper-evident structure removed from the carton.

As shown in FIG. 10, upon separation of the structure 321 from the carton 101, the lid 105 becomes accessible and the tamper-evident portions 355, 357 remain attached to the ends of container 103 to provide indication that the structure 321 has been removed and the lid 105 is accessible. The tamper-evident structure 321 can be otherwise shaped, arranged, and/or configured without departing from the disclosure.

In this regard, the tamper-evident structure 321 includes one or both of the tamper-evident portions 355, 357 as indicating features that provide a visual indication that the tamper-evident structure 321 has been at least partially removed from the carton 101 allowing removal of the lid 105 from the container 103, or that the lid has been removed from the container.

It will be understood that the structure 321 could have other tamper-evident portions that remain attached to container 103 and/or lid 105, and/or that one or both of the tamper-evident portions 355, 357 could be alternatively configured or omitted from the tamper-evident structure 321 without departing from the disclosure. In one embodiment, the tamper-evident portions 355, 357 could be printed with indicia or labeling to indicate to a user that the structure 321 is removable/has been removed from the carton 101 and that the lid 105 is removable/has been at least partially removed from the container 103 to allow access to food product within the container 103. The structure 321 could be otherwise shaped, arranged, and/or configured without departing from the disclosure.

Figure 11:
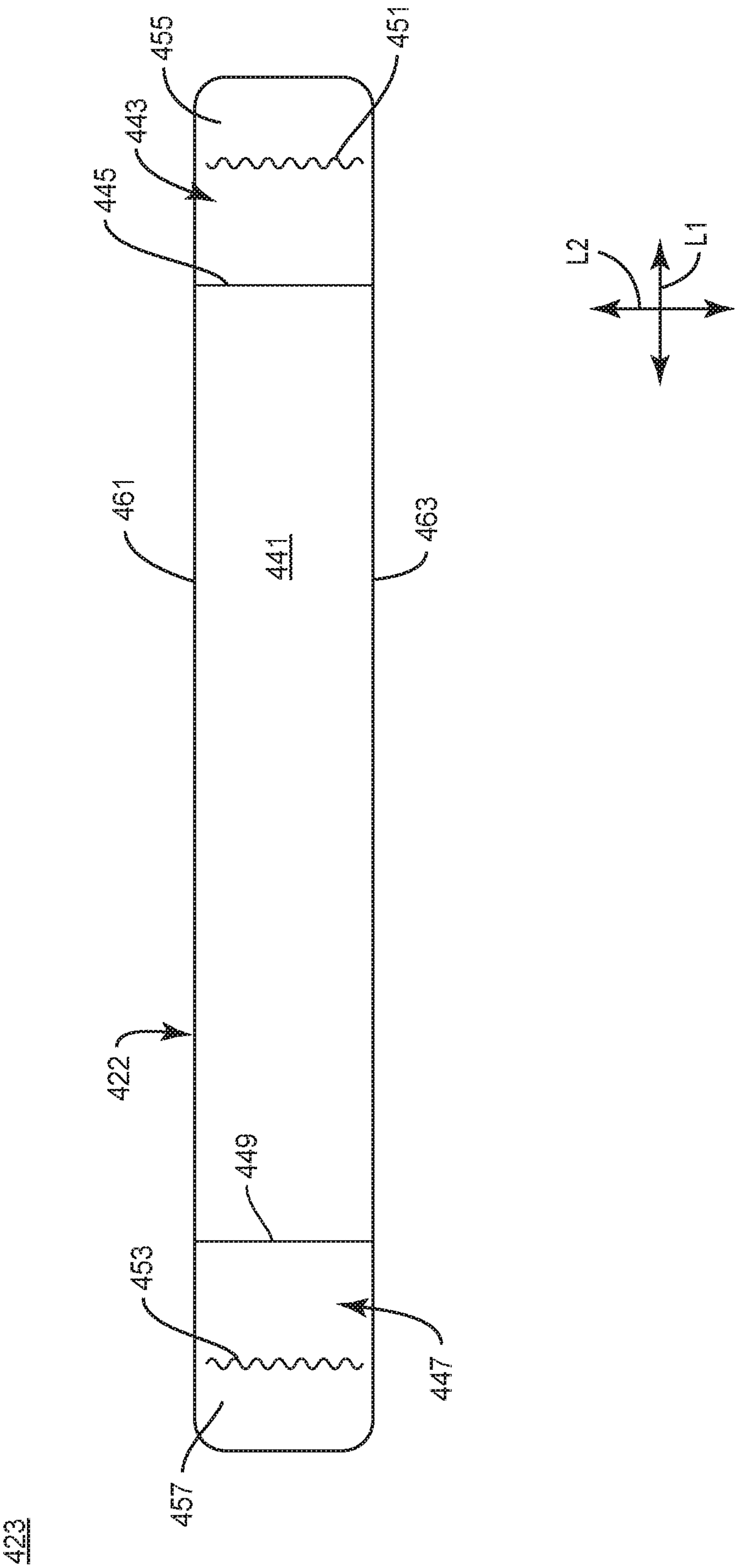
FIG. 11 is a plan view of an exterior surface of a blank for forming a tamper-evident structure according to a fourth exemplary embodiment of the disclosure.

FIG. 11 shows a plan view of an exterior surface 422 of a blank 423 for forming a tamper-evident structure 421 according to a fourth exemplary embodiment of the disclosure. The blank 423 and tamper-evident structure 421 can have one or more features similar to the blanks 123, 223, 323 and tamper-evident structures 121, 221, 321 described above, and like or similar features are designated with like or similar reference numerals. The tamper-evident structure 421 can be engaged or otherwise provided with a canister or container 103 and an accompanying lid 105 to form a package 400.

The tamper-evident structure 421 can be used in combination with the same style of container 103 as the tamper-evident structures 121, 221, 321 to form a package 400 having tamper-evident features. In one embodiment, the tamper-evident structure 421 can be attached to the inside surface of the lid 105 prior to filling and closing the container 103.

As shown in FIG. 11, the blank 323 has the longitudinal axis L1 and that lateral axis L2 and includes a top panel or central panel 441, a first side flap 443 (broadly, "first side panel") foldably connected to the central panel 441 at a lateral fold line 445, and a second side flap 447 (broadly, "second side panel") foldably connected to the central panel 441 at a lateral fold line 449. Each of the side flaps 443, 447 have a respective lateral tear line/line of weakening 451, 453 that defines a respective tamper-evident portion 455, 457 at the distal end of the respective side flap 443, 447. The tear lines 451, 453, as shown, can include one or more curved portions, e.g., so as to include one or more sinusoidal cut portions and/or wave portions. One or both of the tear lines 451, 453 can include one or more discontinuities therealong. In one embodiment, the blank 423 has respective straight longitudinal edges 461, 463, but the blank 423 could be otherwise shaped, arranged, and/or configured without departing from the disclosure.

The tamper-evident structure 421 can be sized and shaped so that the central panel 441 extends across the length of the inside surface of the central panel 115 of the lid 105, and so that the side flaps 443, 447 extend downwardly from the lid 105 to be adjacent a portion of the outer surface of the side wall 113 at the ends of the container 103 when the package 400 is formed from the container 103, the lid 105, and the tamper-evident structure 421.

Figure 12:
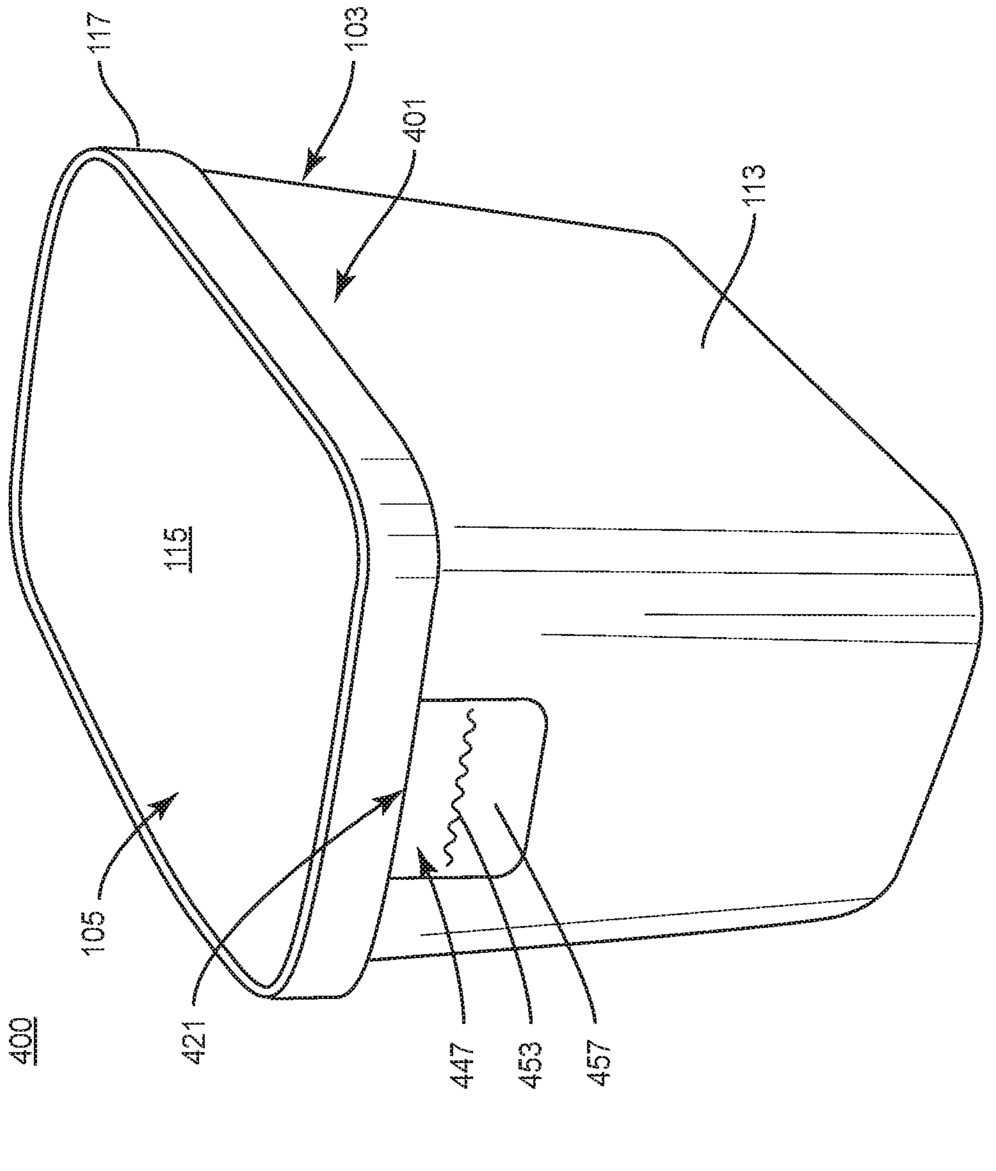
FIG. 12 is a perspective view of a package including a carton and a tamper-evident structure formed from the blank of FIG. 11 according to the fourth exemplary embodiment of the disclosure.

With additional reference to FIG. 12, the carton 401 is formed in a similar manner as the previous embodiments in that the container 103 can be filled with food product and the lid 105 attached to the container 105 to close the carton 105. However, in the illustrated embodiment, the tamper-evident structure 421 can be attached to the lid 105 prior to closing the carton 101.

The central panel 441 of the structure 421 can be adhesively attached to the inner surface an inner surface 116 (FIG. 13) of the central panel 115 of the lid 105 by adhesive such as glue, and the lid 105 can be attached to the container 103 to close the carton 105 by engagement of the rim 17 with the upper edge of the side wall 113 of the container 103.

After the lid 105 is secured to the container 103, the tamper-evident portions 455, 457 of the flaps 443, 447 of the structure 421 are attached to the outer surface of the side wall 113 at the ends of the container 103 by adhesive such as glue. The attachment of the tamper-evident structure 421 to the carton 105 inhibits or prevents removal of the lid 105 from the container 103 without tearing, deforming, removing, and/or otherwise altering the structure 421.

Figure 13:
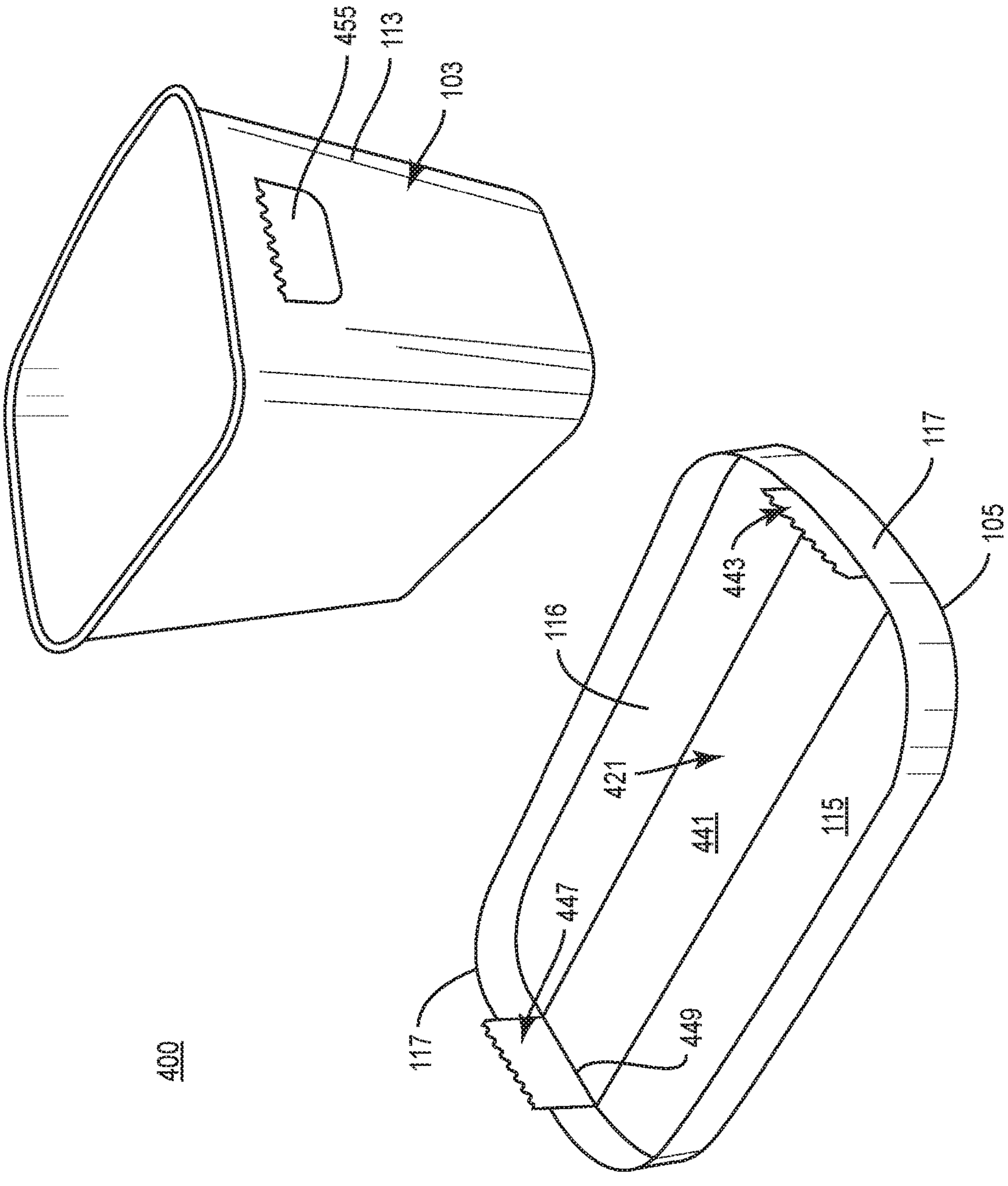
FIG. 13 is a bottom perspective view of the package of FIG. 12 with the tamper-evident structure removed from the carton.

As shown in FIG. 13, in the illustrated embodiment, the tamper-evident structure 421 is attached to the lid 105 so that when the lid 105 is initially separated from the container 103 to open the container 101, the tamper-evident portions 455, 457 separate at respective tear lines 451, 453 and remain attached to the ends of container 103 to provide indication that the lid 105 with the attached structure 421 has been opened.

In this regard, the tamper-evident structure 421 includes one or both of the tamper-evident portions 455, 457 as indicating features that provide indication that the tamper-evident structure 421 is removable/has been at least partially removed from the carton 101 allowing removal of the lid 105 from the container 103, or that the lid has been removed from the container.

It will be understood that the structure 421 could have other tamper-evident portions that remain attached to container 103 and/or lid 105, and/or that one or both of the tamper-evident portions 455, 457 could be alternatively configured or omitted from the tamper-evident structure 421 without departing from the disclosure. In one embodiment, the tamper-evident portions 455, 457 could be printed with indicia or labeling to indicate to a user that the structure 421 is removable/has been removed from the carton 101 and that the lid 105 is removable/has been at least partially removed from the container 103 to allow access to food product within the container 103. The structure 421 could be otherwise shaped, arranged, and/or configured without departing from the disclosure.

Figure 14:
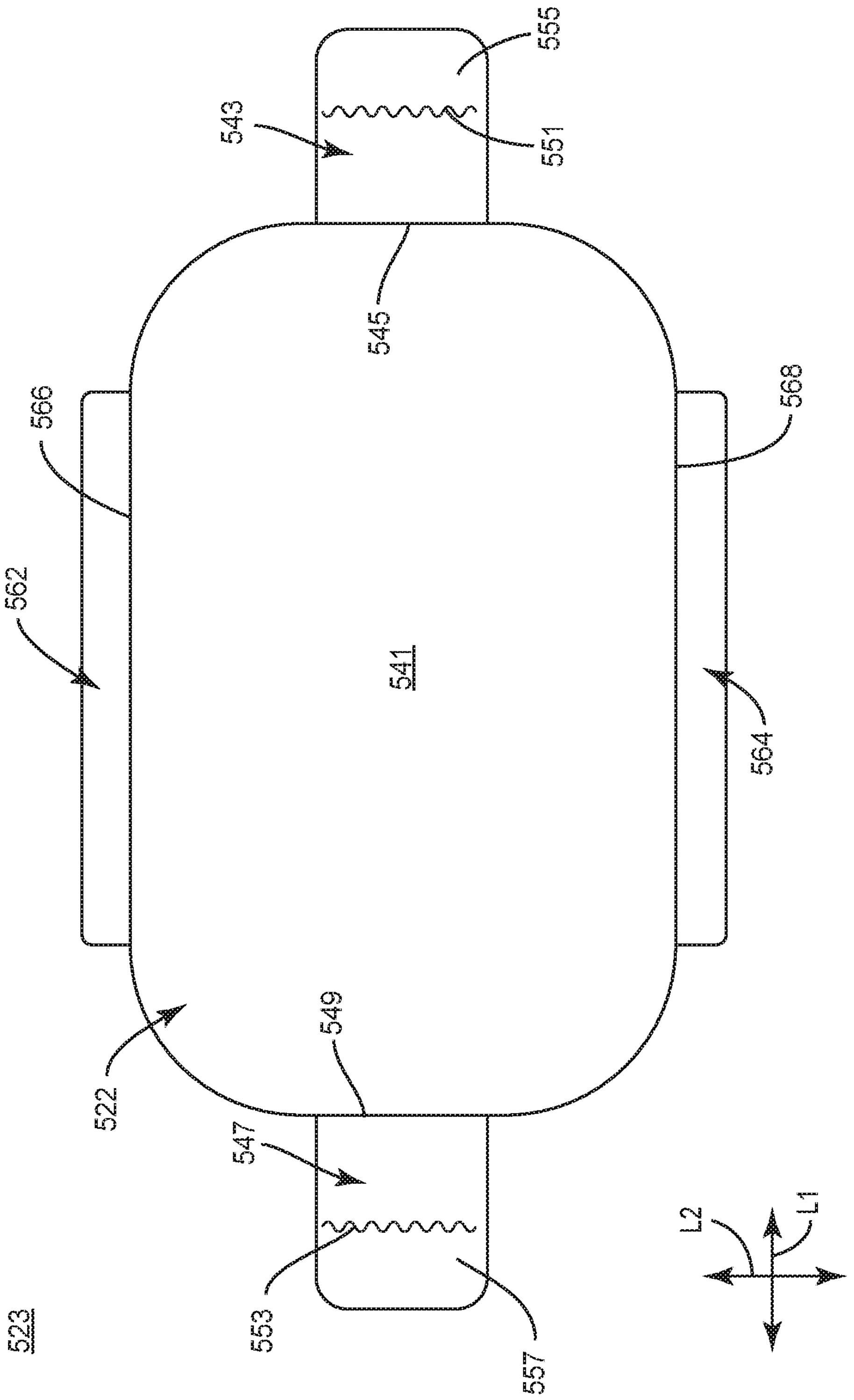
FIG. 14 is a plan view of an exterior surface of a blank for forming a tamper-evident structure according to a fifth exemplary embodiment of the disclosure.

FIG. 14 shows a plan view of an exterior surface 522 of a blank 523 for forming a tamper-evident structure 521 according to a fifth exemplary embodiment of the disclosure. The blank 523 and tamper-evident structure 521 can have one or more features similar to the blanks 123, 223, 323, 423 and tamper-evident structures 121, 221, 321, 421 described above, and like or similar features are designated with like or similar reference numerals. The tamper-evident structure 521 can be engaged or otherwise provided with a carton to form a package 500. However, in contrast to the cartons described above, the tamper-evident structure 521 can at least partially form a lid 505 for engagement with a container 103. In one embodiment, the tamper-evident structure 521 can be provided independently of a lid.

As shown in FIG. 11, the blank 523 has the longitudinal axis L1 and that lateral axis L2 and includes a top panel or central panel 541, a first side flap 543 (broadly, "first side panel") foldably connected to the central panel 541 at a lateral fold line 545, and a second side flap 547 (broadly, "second side panel") foldably connected to the central panel 541 at a lateral fold line 549. Each of the side flaps 543, 547 have a respective lateral tear line/line of weakening 551, 553 that define a respective tamper-evident portion 555, 557 at the distal end of the respective side flap 543, 547. The tear lines 451, 453, as shown, can include one or more curved portions, e.g., so as to include one or more sinusoidal cut portions and/or wave portions. One or both of the tear lines 451, 453 can include one or more discontinuities therealong.

In one embodiment, the blank 523 can have reinforcing flaps 562, 564 foldably connected to the central panel 541 at respective longitudinal fold lines 566, 568. The reinforcing flaps 462, 464 are for facilitating attachment of the plastic rim 117 to the paperboard structure 521 to form the lid 505. The blank 423 could be otherwise shaped, arranged, and/or configured without departing from the disclosure.

Figure 15:
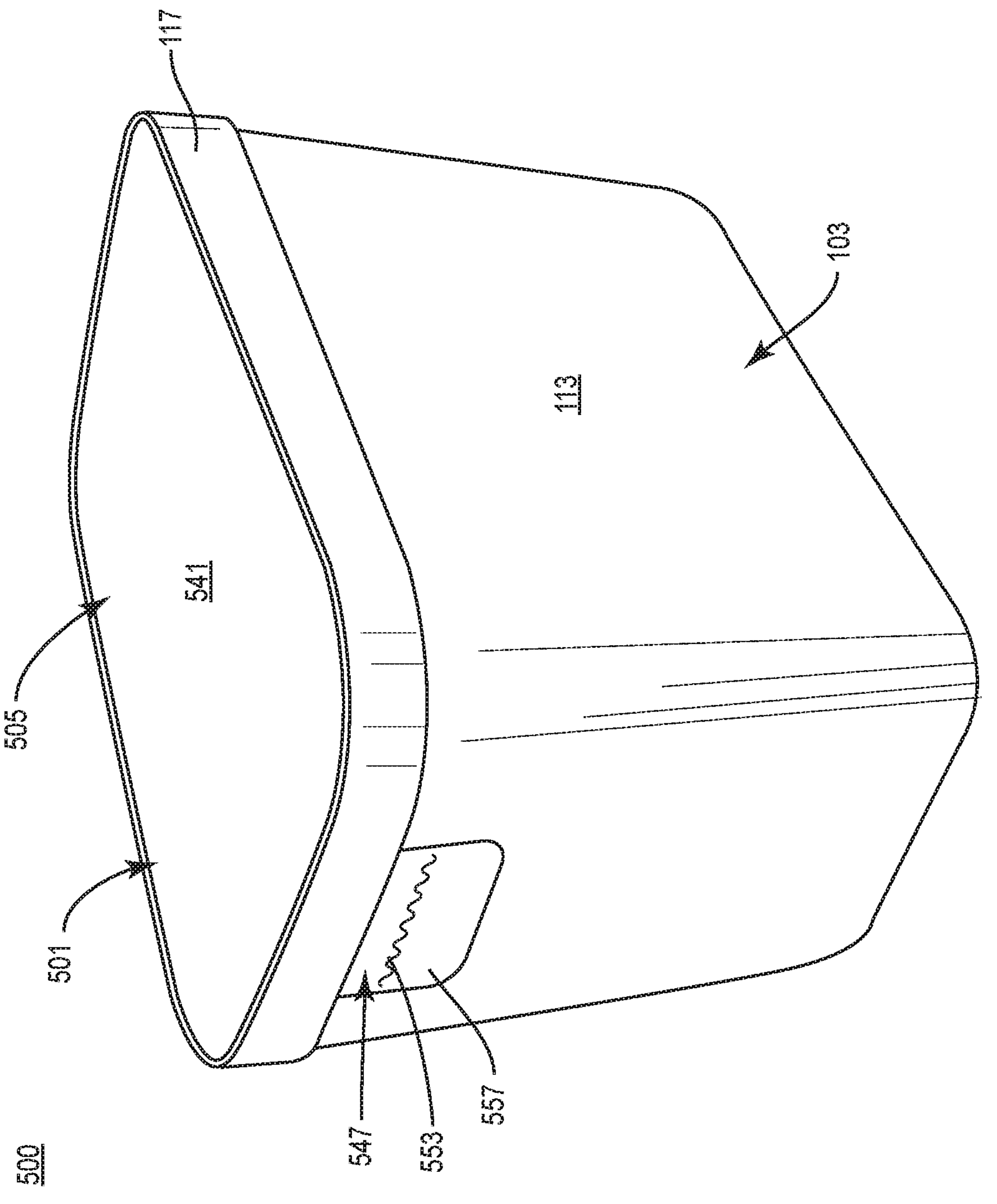
FIG. 15 is a perspective view of a package including a carton and a tamper-evident structure formed from the blank of FIG. 14 according to the fifth exemplary embodiment of the disclosure.
Figure 16:
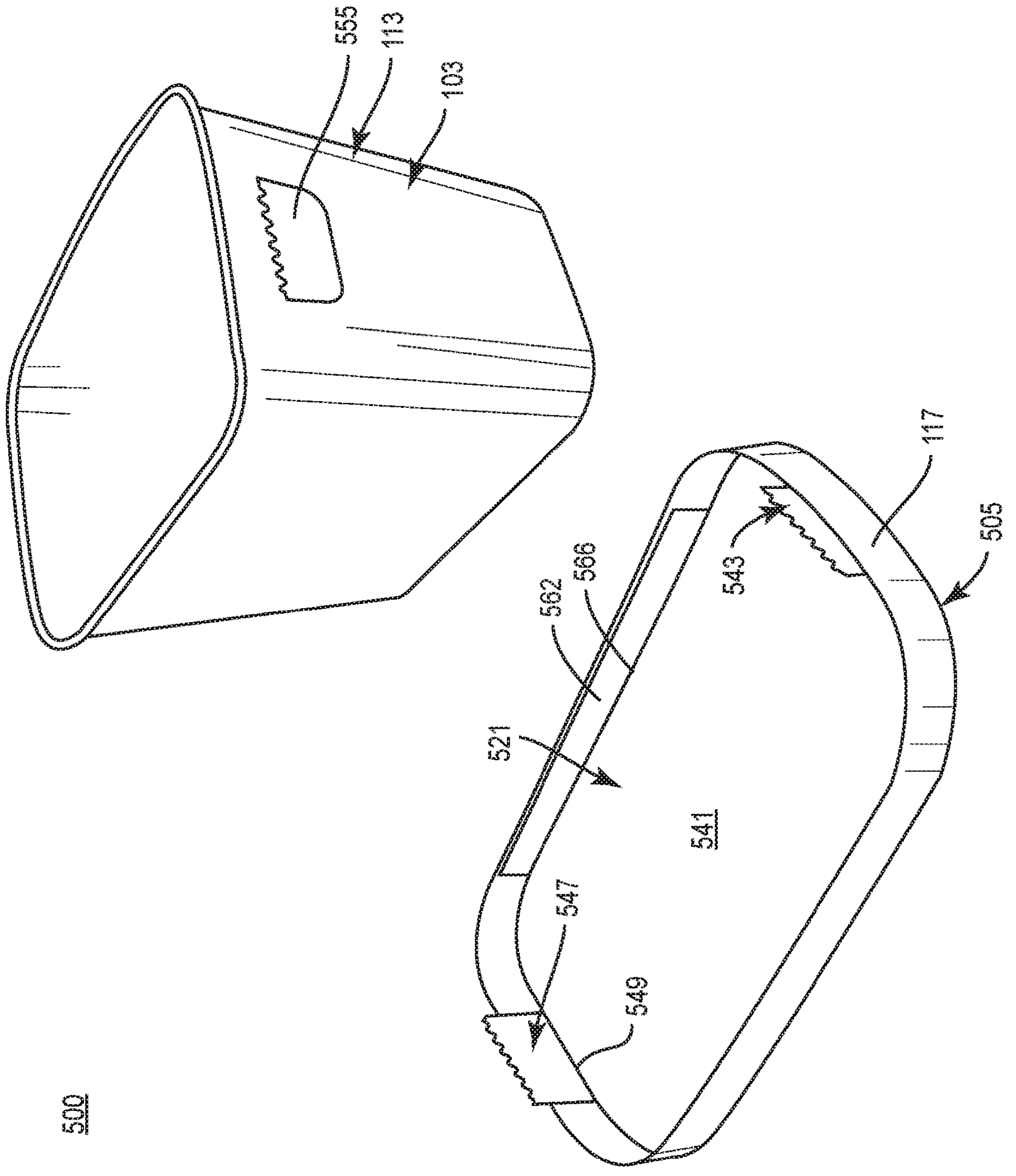
FIG. 16 is a bottom perspective view of the package of FIG. 15 with the tamper-evident structure removed from the carton.

As shown in FIGS. 15 and 16, the tamper-evident structure 521 is sized and shaped so that the central panel 541 is sized to correspond to the central panel 115 of the lid 105 of the previous embodiments.

In one embodiment, the lid 505 can be formed by attaching the rim structure 117 to the tamper-evident structure 521. The reinforcing flaps 562, 564 can be folded relative to the central panel 541 at the respective fold lines 566, 568 to engage the rim 117 and facilitate attachment of the 117 rim to the tamper-evident structure 521.

The rim 117 can be made of plastic and can be formed by injection-molding the plastic around the tamper-evident structure, or by any other conventional methods of attaching the rigid structure of the rim 17 to the paperboard blank 523 to form the lid 505.

Upon the aforementioned formation of the lid 505, the side flaps 543, 547 are arranged to extend downwardly from the rim 117 of the lid 505. The lid 505 can then be attached to the filled container 103 to form a closed carton 501/package 500.

When the lid 505 is attached to the container 103 as described above, the side flaps 543, 547 can be positioned adjacent a portion of the outer surface of the side wall 113 at the ends of the container 103. Upon securing the lid 505 to the container 103, the tamper-evident portions 555, 557 of the flaps 543, 547 of the structure 521 can be attached to the outer surface of the side wall 113 at the ends of the container 103 by adhesive such as glue.

The attachment of the tamper-evident structure 521 to the container 103 inhibits and/or prevents removal of the lid 505 from the container 103 without first separating the structure at the tear lines 551, 553. In the illustrated embodiment, the tamper-evident structure 521 is incorporated into the lid 505, so that when the lid 505 is initially separated from the container 103 to open the carton package 500/carton 501, the tamper-evident portions 555, 557 separate at respective tear lines 551, 553 and remain attached to the ends of container 103.

In this regard, the tamper-evident structure 521 includes one or both of the tamper-evident portions 555, 557 as indicating features that provide a visual indication that the lid 505 is removable or has been at least partially removed from the container 103. One or both of the tamper-evident portions 555, 557 could be alternatively configured or omitted from the tamper-evident structure 521 without departing from the disclosure.

Figure 17:
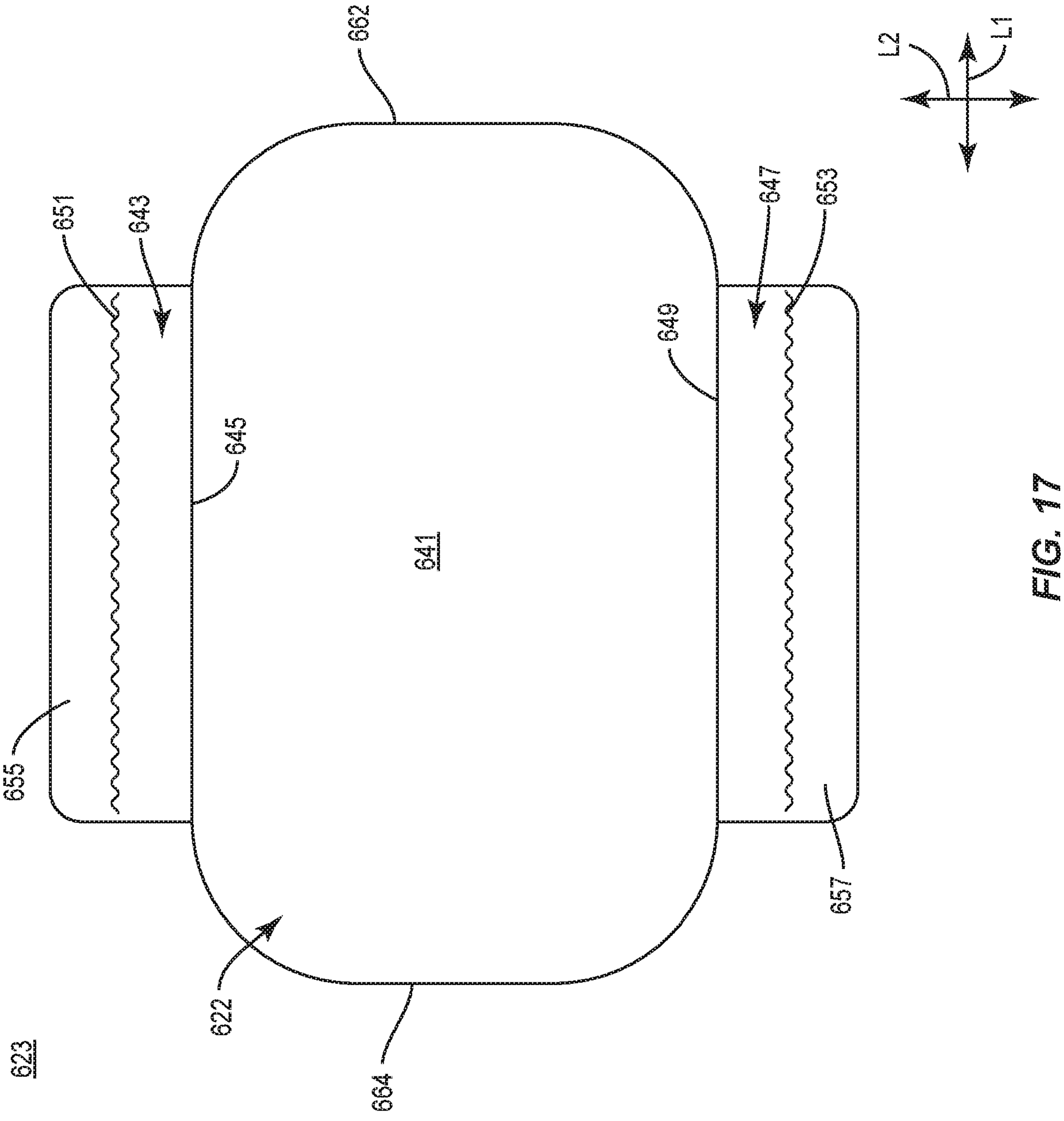
FIG. 17 is a plan view of an exterior surface of a blank for forming a tamper-evident structure according to a sixth exemplary embodiment of the disclosure.

FIG. 17 shows a plan view of an exterior surface 622 of a blank 623 for forming a tamper-evident structure 621 according to a sixth exemplary embodiment of the disclosure. The blank 623 and tamper-evident structure 621 can have one or more features similar to the blanks 123, 223, 323, 423, 523 and tamper-evident structures 121, 221, 321, 421, 521 described above, and like or similar features are designated with like or similar reference numerals. The tamper-evident structure 621 can be engaged or otherwise provided with a carton to form a package 600. Similar to the tamper-evident structure 521 described above, the tamper-evident structure 621 can at least partially form a lid 605 for engagement with a container 103. In one embodiment, the tamper-evident structure 621 can be provided independently of a lid.

As shown in FIG. 17, the blank 623 has the longitudinal axis L1 and that lateral axis L2 and includes a top panel or central panel 641, a first side flap 643 (broadly, "first side panel") foldably connected to the central panel 641 at a longitudinal fold line 645, and a second side flap 647 (broadly, "second side panel") foldably connected to the central panel 641 at a longitudinal fold line 649. Each of the side flaps 643, 647 have a respective longitudinal tear line 651, 653 that define a respective tamper-evident portion 655, 657 at the distal end of the respective side flap 643, 647. The tear lines 651, 653, as shown, can include one or more curved portions, e.g., so as to include one or more sinusoidal cut portions and/or wave portions. One or both of the tear lines 651, 653 can include one or more discontinuities therealong.

In one embodiment, the blank 623 has ends 662, 664 that are free edges of the central panel 641 that are free from connection to any panel, flap, or other structure. As described further herein, in addition to having tamper-evident portions 655, 657, the flaps 643, 647 facilitate attachment of the plastic rim 17 to the paperboard structure 621 to form the lid 605. The blank 623 could be otherwise shaped, arranged, and/or configured without departing from the disclosure.

Figure 18:
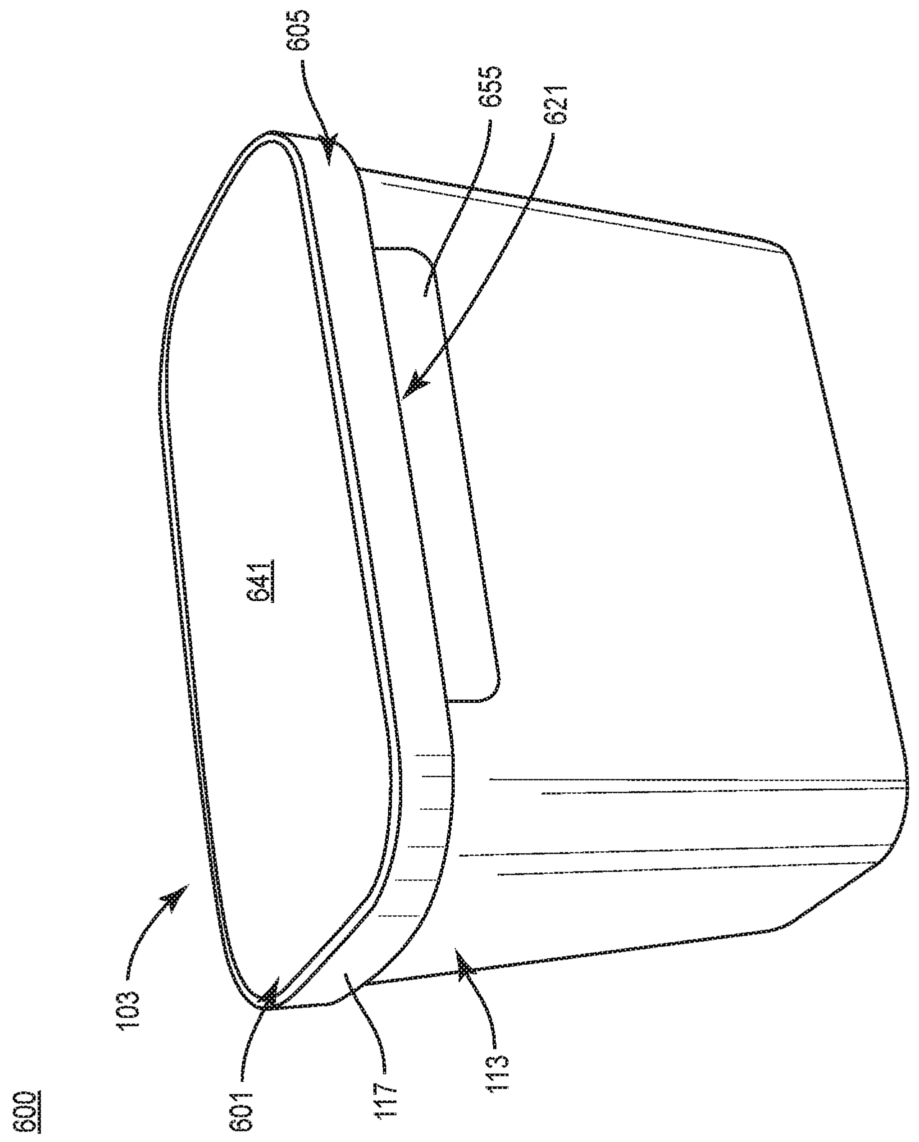
FIG. 18 is a perspective view of a package including a carton and a tamper-evident structure formed from the blank of FIG. 17 according to the sixth exemplary embodiment of the disclosure.
Figure 19:
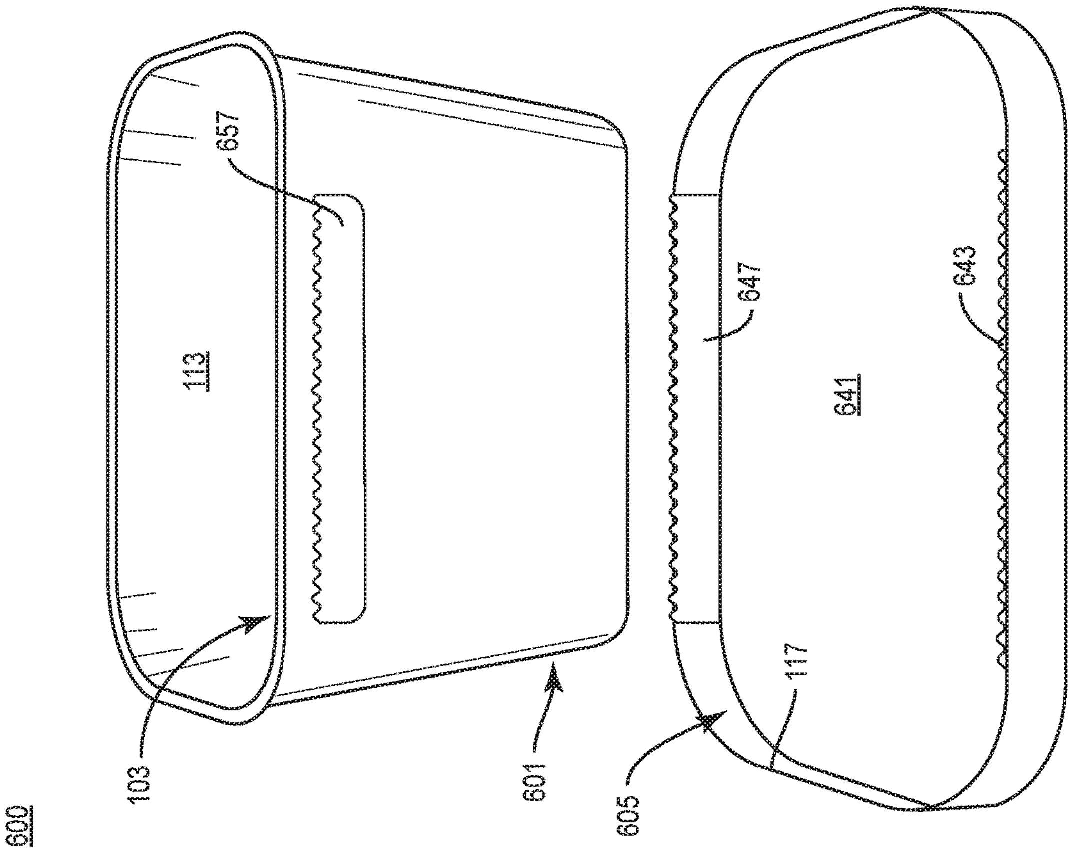
FIG. 19 is a bottom perspective view of the package of FIG. 18 with the tamper-evident structure removed from the carton.

As shown in FIGS. 18 and 19, the tamper-evident structure 621 is sized and shaped so that the central panel 641 is sized to correspond to the central panel 115 of the lid 105 of the previous embodiments. The lid 605 of the illustrated embodiment can be formed by attaching the rim structure 117 to the tamper-evident structure 621.

The flaps 643, 647 can be folded relative to the central panel 641 at the respective fold lines 645, 649 to engage the rim 117 and facilitate attachment of the rim 117 to the tamper-evident structure 621 to form the lid 605. In one embodiment, the rim 117 can be made of plastic and can be formed by injection-molding the plastic around the tamper-evident structure 621, or by any other conventional methods of attaching the rigid structure 117 to the paperboard blank 623 to form the lid 605.

In the aforementioned arrangement, the side flaps 643, 647 extend downwardly from the rim 117 of the lid 605. The lid 605 can then be attached to the filled container 103 to form the package 600/closed carton 601. When the lid 605 is attached to the container 103, the side flaps 643, 647 are adjacent a portion of the outer surface of the side wall 113 at the front and back of the container 103.

After the lid 605 is secured to the container 103, the tamper-evident portions 655, 657 of the flaps 643, 647 of the structure 621 can be attached to the outer surface of the side wall 113 at the front and back of the container 103 by adhesive such as glue.

The attachment of the tamper-evident structure 621 to the container 103 inhibits and/or prevents removal of the lid 605 from the container 103 without first separating the structure 621 at the tear lines 651, 653. In the illustrated embodiment, the tamper-evident structure 621 is incorporated into the lid 605, so that when the lid 605 is initially separated from the container 103 to open the package 600/carton 601, the tamper-evident portions 655, 657 separate at respective tear lines 651, 653 and remain attached to the ends of container 103.

In this regard, the tamper-evident structure 621 includes one or both of the tamper-evident portions 655, 657 as indicating features that provide visual indication that the lid 605 is removable or has been at least partially removed from the container 103. One or both of the tamper-evident portions 655, 657 could be alternatively configured or omitted from the tamper-evident structure 621 without departing from the disclosure.

Figure 20:
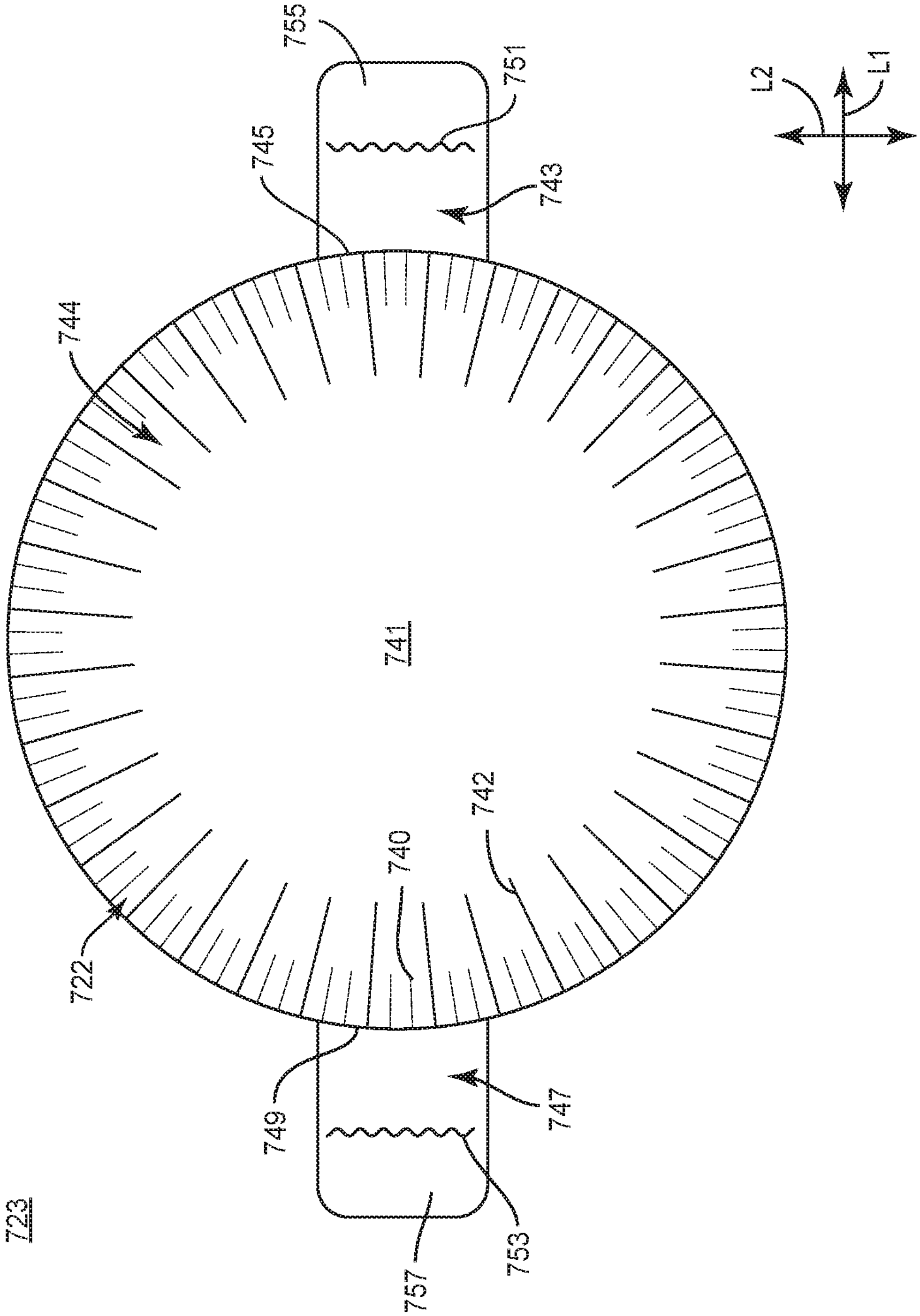
FIG. 20 is a plan view of an exterior surface of a blank for forming a tamper-evident structure according to a seventh exemplary embodiment of the disclosure.

FIG. 20 shows a plan view of an exterior surface 722 of a blank 723 for forming a tamper-evident structure 721 according to a seventh exemplary embodiment of the disclosure. The blank 723 and tamper-evident structure 721 can have one or more features similar to the blanks 123, 223, 323, 423, 523, 623 and tamper-evident structures 121, 221, 321, 421, 521, 521, 621 described above, and like or similar features are designated with like or similar reference numerals.

The tamper-evident structure 721 can be engaged or otherwise provided with a carton to form a package 700. However, similar to the tamper-evident structure 621 described above, the tamper-evident structure 721 can at least partially form a lid 705 for engagement with a container. In one embodiment, the tamper-evident structure 721 can form the entire lid 705. In this regard, the lid 705 can be formed entirely or substantially entirely of paperboard. In another embodiment, the tamper-evident structure 721 can be provided independently of a lid.

Figure 21:
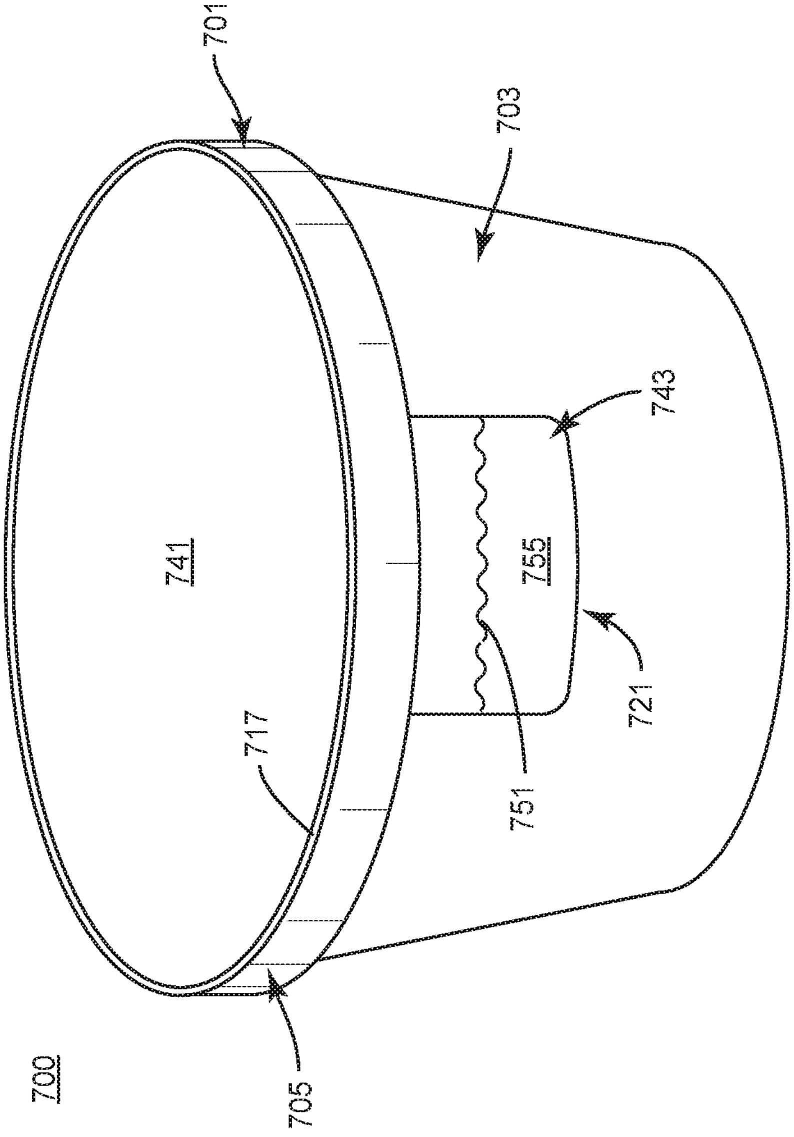
FIG. 21 is a perspective view of a package including a carton and a tamper-evident structure formed from the blank of FIG. 20 according to the seventh exemplary embodiment of the disclosure.
Figure 22:
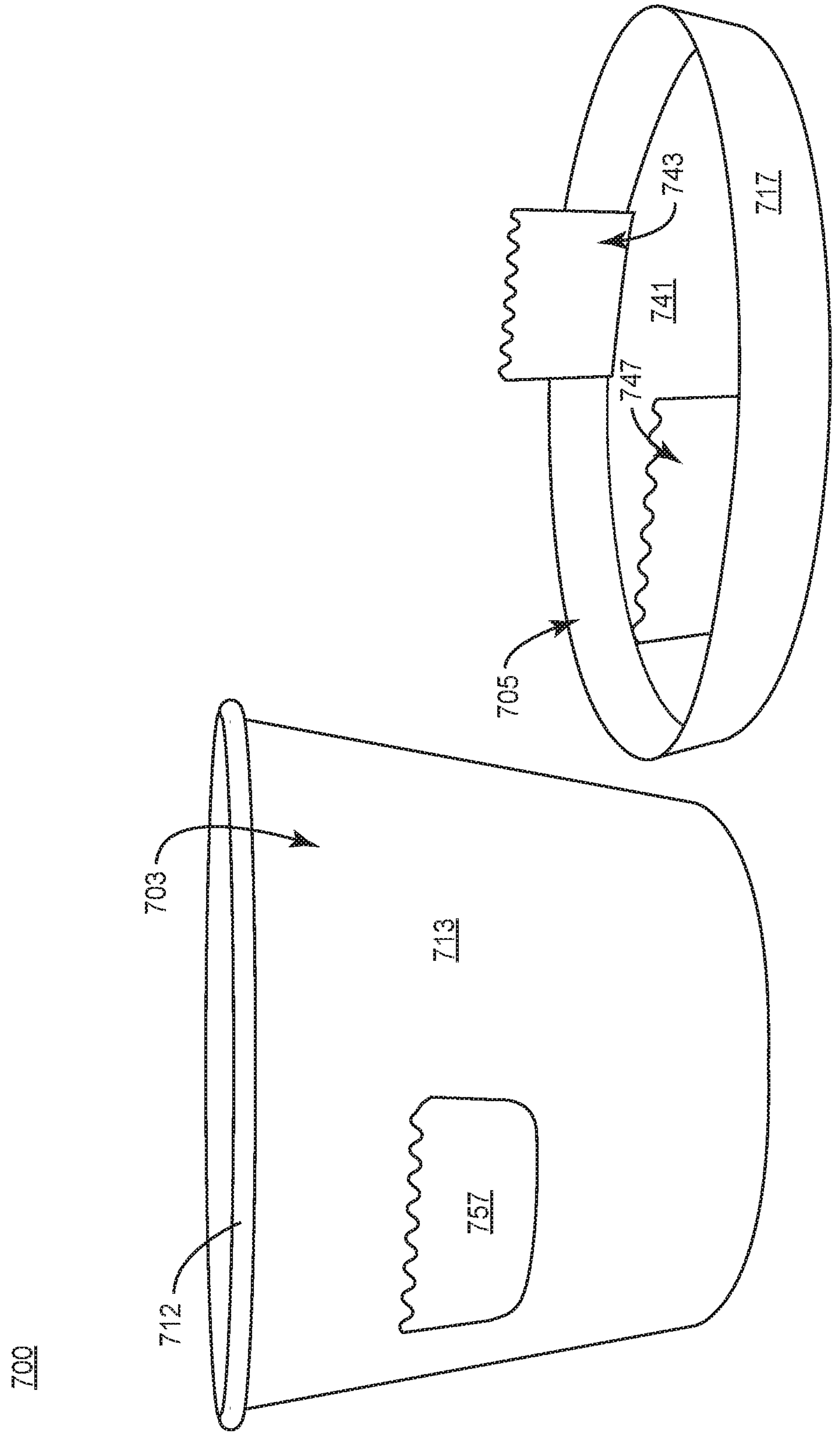
FIG. 22 is a bottom perspective view of the package of FIG. 21 with the tamper-evident structure removed from the carton.

As shown in FIG. 20, the tamper-evident structure 721 is formed from a blank 723 having the longitudinal axis L1 and the lateral axis L2. The blank 723 has a top or central panel 741 with a plurality of lines of weakening 740, 742 radially extending along a peripheral region 744 of the central panel 741 for at least partially forming a flange rim 717 of the lid 705 (FIG. 21). In one embodiment, the blank 723 can have a different arrangement of lines of weakening, or can be devoid of the lines of weakening 740, 742.

As also shown, a first tab or first side flap 743 (broadly, "first side panel") is foldably connected to a first side of the central panel 741 at a curved line of weakening 749 and a second tab or second side flap 747 (broadly, "second side panel") foldably connected to the central panel 741 at a curved line of weakening 745.

The tabs 743, 747 can be angularly spaced approximately 180 degrees around the perimeter of the central panel 741, but the tabs 743 747 could be otherwise located without departing from the disclosure. In one embodiment, the tabs 743, 747 can be attached to the inside surface of the flange rim 717 of the lid 605 by adhesive such as glue. Alternatively, the tabs 743, 747 could be integral with and extensions of the flange rim 717 without departing from the disclosure. Further, the tabs 743, 747 could be foldably connected to a central panel that is in face-to-face contact with the central panel 741 of the lid 705 without departing from the disclosure.

As shown, each of the tabs 743, 747 have a respective longitudinal tear line/line of weakening 751, 753 that defines a respective tamper-evident portion 755, 757 at the distal end of the respective tab 743, 747. The tear lines 751, 753, as shown, can include one or more curved portions, e.g., so as to include one or more sinusoidal cut portions and/or wave portions. One or both of the tear lines 751, 753 can include one or more discontinuities therealong.

With additional reference to FIG. 21, the lid 705 of the illustrated embodiment can be formed by folding/moving/urging the peripheral region 744 of the blank 723 downwardly to form the flange rim 717 of the lid 705. Such movement of the peripheral region of the blank 744 can cause adjacent portions thereof to at least partially fold and overlap at the respective lines of weakening 740, 742 so as to form a pleated arrangement. The lid 705 can then be attached to a filled container 703 to form a closed carton 701/package 700, with the tabs 743, 747 positioned to extend downwardly from the flange rim 717.

As shown, the carton 701 includes a generally round container 703 with a curved sidewall 713 having an upper portion or rim 712, and the lid 705, but the carton 701 could be otherwise shaped, arranged, and/or configured without departing from the disclosure. For example, the lid 705 and container 703 could be shaped similar to the lid 105 and container 103 of the previous embodiments without departing from the disclosure. In the illustrated embodiment, the lid 705 can be lowered onto the container 703 so that the flange rim 717 engages and/or extends at least partially around the upper portion 712 of the sidewall 713.

When the lid 705 is attached to the container 703 as described above, the tabs 743, 747 can be positioned adjacent a portion of the outer surface of the sidewall 713. After the lid 705 is secured to the container 703, the tamper-evident portions 755, 757 of the tabs 743, 747 of the structure 721 are attached to the outer surface of the side wall 713 by adhesive such as glue.

The attachment of the tamper-evident structure 721 to the container 703 inhibits and/or prevents removal of the lid 705 from the container 703 without first separating the structure at the tear lines 751, 753. In the illustrated embodiment, the tamper-evident structure 721 is incorporated into the lid 705, so that when the lid 705 is initially separated from the container 703 to open the package 700/carton 701, the tamper-evident portions 755, 757 separate at respective tear lines 751, 753 and remain attached to the ends of container 703.

In this regard, the tamper-evident structure 721 includes one or both of the tamper-evident portions 755, 757 as indicating features that provide visual indication that the lid 705 is removable or has been at least partially removed from the container 703. One or both of the tamper-evident portions 755, 757 could be alternatively configured or omitted from the tamper-evident structure 721 without departing from the disclosure.

Figure 23:
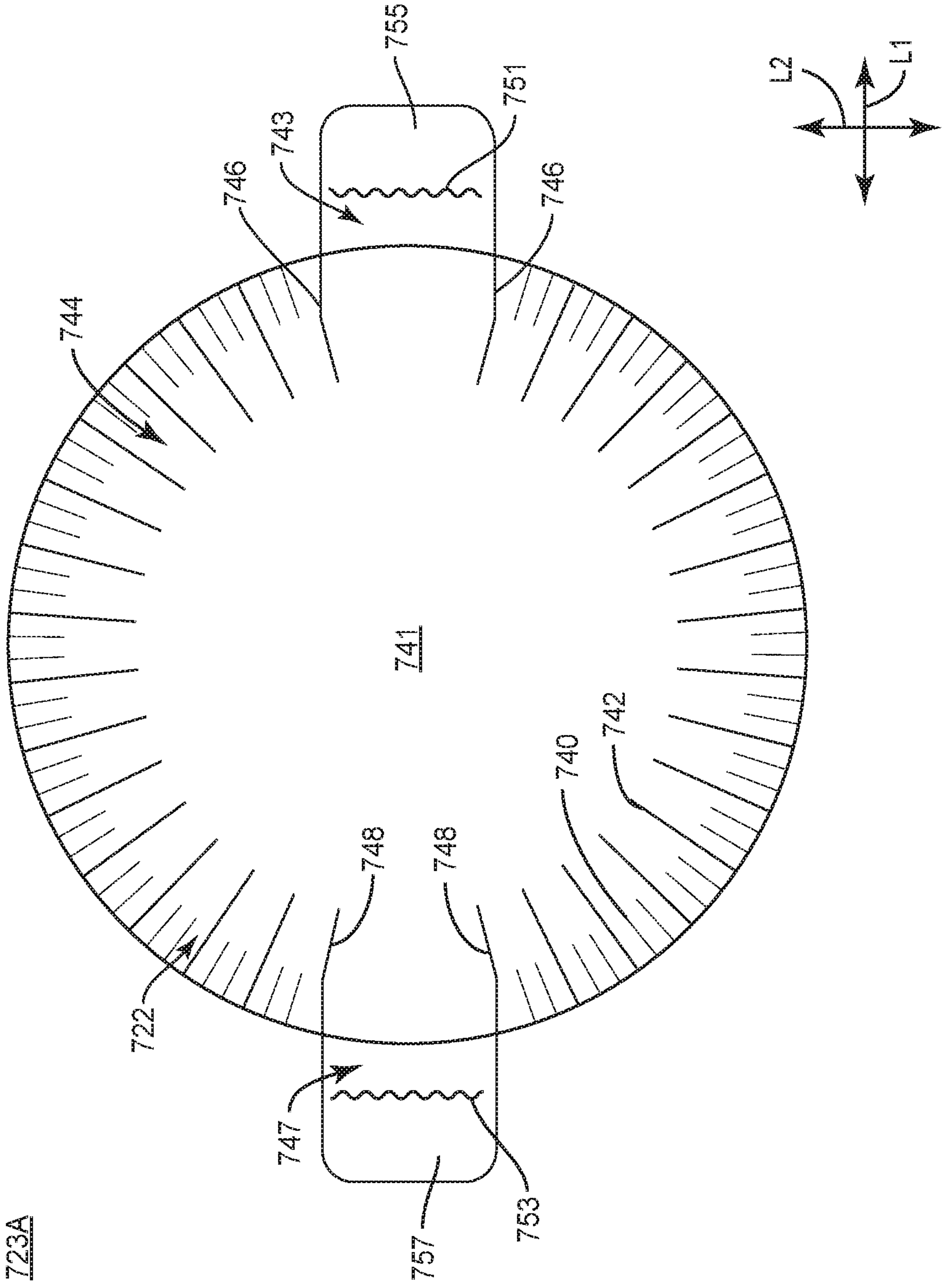
FIG. 23 is a plan view of an alternative configuration of the blank of FIG. 20 according to an exemplary embodiment of the disclosure.

Referring additionally to FIG. 23, an alternative configuration of the blank 723 for forming the tamper-evident structure 721 is generally designated 723A. The blank 723A, as shown, can include features that are substantially similar to those of the blank 723 described above, except that the blank 723A is devoid of the line of weakening 745 and the tab 743 is further defined by a pair of laterally spaced cuts 746 that extend into the central panel 741. Similarly, the blank 723A is devoid of the line of weakening 749 and the tab 747 is further defined by a pair of laterally spaced cuts 748 that extend into the central panel 741. One or both of the cuts 746, 748 can include one or more curved or angled portions. In this regard, the attachment of the tabs 743, 747 to the peripheral region 744/flange rim 717 can be that of a separable attachment at the respective cuts 746, 748.

The blank 723A can be formed into the tamper-evident structure 721/lid 705 and attached to a container 703 to form the package 700 in a manner substantially similar to that described above with regard to the blank 723. The cuts 746, 748 can facilitate positioning of the tabs 743, 747 relative to the central panel 741 and/or attachment of the tamper-evident portions 755, 757 to the container 703.

In general, the tamper-evident structure, container, and/or lid may be constructed from a paperboard blank having a caliper so that it is heavier and more rigid than ordinary paper. The blank can also be constructed of other materials, such as cardboard, or any other material having properties suitable for enabling the construct formed from the blank to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels, flaps, or other features adhered together by glue during erection of the various embodiments. The term "glue" is intended to encompass all manner of adhesives commonly used to secure paperboard carton features, or carton features comprising other materials, in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A tamper-evident structure for securing a lid to a container of a carton for holding a food product, the tamper-evident structure comprising:

- a plurality of panels comprising a top panel and at least one side panel, at least one panel of the plurality of panels is for being attached to at least one of the lid and the container of the carton; and
- at least one indicating feature provides indication that the lid has been at least partially removed from the container, the at least one indicating feature is defined by at least one line of weakening on a respective panel of the plurality of panels.

2. The tamper-evident structure of claim 1, wherein the at least one indicating feature is for being separated from a respective panel of the plurality of panels when the lid is at least partially removed from the container.

3. The tamper-evident structure of claim 2, wherein the at least one indicating feature is attached to a portion of the container of the carton.

4. The tamper-evident structure of claim 1, wherein the plurality of panels further comprises a bottom panel, and the at least one indicating feature is an at least one tamper-evident portion defined by at least one curved line of weakening in the bottom panel.

5. The tamper-evident structure of claim 4, wherein the at least one indicating feature is a first indicating feature, and the tamper-evident structure further comprises a second indicating feature comprising a tear strip defined between a pair of lines of weakening in the top panel.

6. The tamper-evident structure of claim 5, wherein the carton further comprises a third indicating feature comprising a tear strip defined between a pair of lines of weakening in the at least one side panel.

7. The tamper-evident structure of claim 1, wherein the at least one line of weakening is positioned in the at least one side panel, and the at least one tamper-evident feature includes at least one tamper-evident portion defined by the at least one line of weakening and separably connected to the remainder of the at least one side panel at the at least one line of weakening.

8. The tamper-evident structure of claim 7, wherein the top panel is for forming at least a portion of the lid.

9. The tamper-evident structure of claim 8, wherein the at least one side panel is foldably connected to the top panel.

10. The tamper-evident structure of claim 9, further comprising at least one reinforcing flap foldably connected to the top panel, the at least one reinforcing flap for being attached to a rim of the lid.

11. The tamper-evident structure of claim 8, wherein the top panel is foldably connected to a flange rim, and the at least one side panel is attached to the flange rim.

12. The tamper-evident structure of claim 11, wherein the flange rim is for extending around and at least partially engaging an upper portion of a sidewall of the container.

13. The tamper-evident structure of claim 12, wherein the lid is formed entirely from paperboard.

14. A package, comprising:

a carton for holding a food product and comprising a container and a lid removably engaged with the container; and a tamper-evident structure securing the lid to the container, the tamper-evident structure comprising:

a plurality of panels comprising a top panel and at least one side panel, at least one panel of the plurality of panels is attached to at least one of the lid and the container of the carton; and at least one indicating feature for providing indication that the lid has been at least partially removed from the container, the at least one indicating feature is defined by at least one line of weakening on a respective panel of the plurality of panels.

15. The package of claim 5, wherein the at least one indicating feature is for being separated from a respective panel of the plurality of panels when the lid is at least partially removed from the container.

16. The package of claim 15, wherein the at least one indicating feature is attached to a portion of the container of the carton.

17. The package of claim 14, wherein the plurality of panels further comprises a bottom panel, and the at least one indicating feature is an at least one tamper-evident portion defined by at least one curved line of weakening in the bottom panel.

18. The package of claim 17, wherein the at least one indicating feature is a first indicating feature, and the tamper-evident structure further comprises a second indicating feature comprising a tear strip defined between a pair of lines of weakening in the top panel.

19. The package of claim 18, wherein the carton further comprises a third indicating feature comprising a tear strip defined between a pair of lines of weakening in the at least one side panel.

20. The package of claim 14, wherein the at least one line of weakening is positioned in the at least one side panel, and the at least one tamper-evident feature includes at least one tamper-evident portion defined by the at least one line of weakening and separably connected to the remainder of the at least one side panel at the at least one line of weakening.

21. The package of claim 20, wherein the top panel forms at least a portion of the lid.

22. The package of claim 21, wherein the at least one side panel is foldably connected to the top panel.

23. The package of claim 22, further comprising at least one reinforcing flap foldably connected to the top panel, the at least one reinforcing flap attached to a rim of the lid.

24. The package of claim 21, wherein the top panel is foldably connected to a flange rim, and the at least one side panel is attached to the flange rim.

25. The package of claim 24, wherein the flange rim extends around and at least partially engages an upper portion of a sidewall of the container.

26. The package of claim 25, wherein the lid is formed entirely from paperboard.

27. A blank for forming a tamper-evident structure for securing a lid to a container of a carton for holding a food product, the blank comprising:

a plurality of panels comprising a top panel and at least one side panel, at least one panel of the plurality of panels is for being attached to at least one of the lid and the container of the carton when the tamper-evident structure is formed from the blank; and at least one indicating feature for providing indication that the lid has been at least partially removed from the container when the tamper-evident structure is formed from the blank, the at least one indicating feature is defined by at least one line of weakening on a respective panel of the plurality of panels.

28. The blank of claim 27, wherein the at least one indicating feature is for being separated from a respective panel of the plurality of panels when tamper-evident structure is formed from the blank and the lid is at least partially removed from the container.

29. The blank of claim 27, wherein the plurality of panels further comprises a bottom panel, and the at least one indicating feature is an at least one tamper-evident portion defined by at least one curved line of weakening in the bottom panel.

30. The blank of claim 29, wherein the at least one indicating feature is a first indicating feature, and the tamper-evident structure further comprises a second indicating feature comprising a tear strip defined between a pair of lines of weakening in the top panel.

31. The blank of claim 30, wherein the carton further comprises a third indicating feature comprising a tear strip defined between a pair of lines of weakening in the at least one side panel.

32. The blank of claim 27, wherein the at least one line of weakening is positioned in the at least one side panel, and the at least one tamper-evident feature includes at least one tamper-evident portion defined by the at least one line of weakening and separably connected to the remainder of the at least one side panel at the at least one line of weakening.

33. The blank of claim 32, wherein the top panel is for forming at least a portion of the lid when the tamper-evident structure is formed from the blank.

34. The blank of claim 33, wherein the at least one side panel is foldably connected to the top panel.

35. The blank of claim 34, wherein the top panel is foldably connected to a flange portion for forming a flange rim when the tamper-evident structure is formed from the blank, and the at least one side panel is attached to the flange portion.

36. The blank of claim 35, wherein the blank is formed entirely from paperboard, and the lid is entirely formed from paperboard when the tamper-evident structure is formed from the blank.

37. A method of securing a lid to a container of a carton for holding a food product, the method comprising:

obtaining a blank comprising a plurality of panels including a top panel and at least one side panel, the blank further including at least one indicating feature; and forming a tamper-evident structure from the blank by attaching at least one panel of the plurality of panels to at least one of the lid and the container of the carton to secure the lid to the container, the at least one indicating feature is positioned for providing indication that the lid has been at least partially removed from the container, the at least one indicating feature is defined by at least one line of weakening on a respective panel of the plurality of panels.

38. The method of claim 37, wherein the at least one indicating feature is for being separated from a respective panel of the plurality of panels when the lid is at least partially removed from the container.

39. The method of claim 38, further comprising attaching the at least one indicating feature to a portion of the container of the carton.

40. The method of claim 37, wherein the plurality of panels further comprises a bottom panel, and the at least one indicating feature is an at least one tamper-evident portion defined by at least one curved line of weakening in the bottom panel.

41. The method of claim 40, wherein the at least one indicating feature is a first indicating feature, and the tamper-evident structure further comprises a second indicating feature comprising a tear strip defined between a pair of lines of weakening in the top panel.

42. The method of claim 41, wherein the carton further comprises a third indicating feature comprising a tear strip defined between a pair of lines of weakening in the at least one side panel.

43. The method of claim 37, wherein the at least one line of weakening is positioned in the at least one side panel, and the at least one tamper-evident feature includes at least one tamper-evident portion defined by the at least one line of weakening and separably connected to the remainder of the at least one side panel at the at least one line of weakening.

44. The method of claim 43, wherein the top panel forms at least a portion of the lid when the tamper-evident structure is formed.

45. The method of claim 44, wherein the at least one side panel is foldably connected to the top panel.

46. The method of claim 45, wherein at least one reinforcing flap is foldably connected to the top panel, and the method further comprising attaching the at least one reinforcing flap to a rim of the lid.

47. The method of claim 44, wherein the top panel is foldably connected to a flange rim, and the at least one side panel is attached to the flange rim.

48. The method of claim 47, wherein the flange rim is for extends around and at least partially engages an upper portion of a sidewall of the container when the tamper-evident structure is formed.

49. The method of claim 48, wherein the lid is formed entirely from paperboard.

* * * * *